Figure 1:
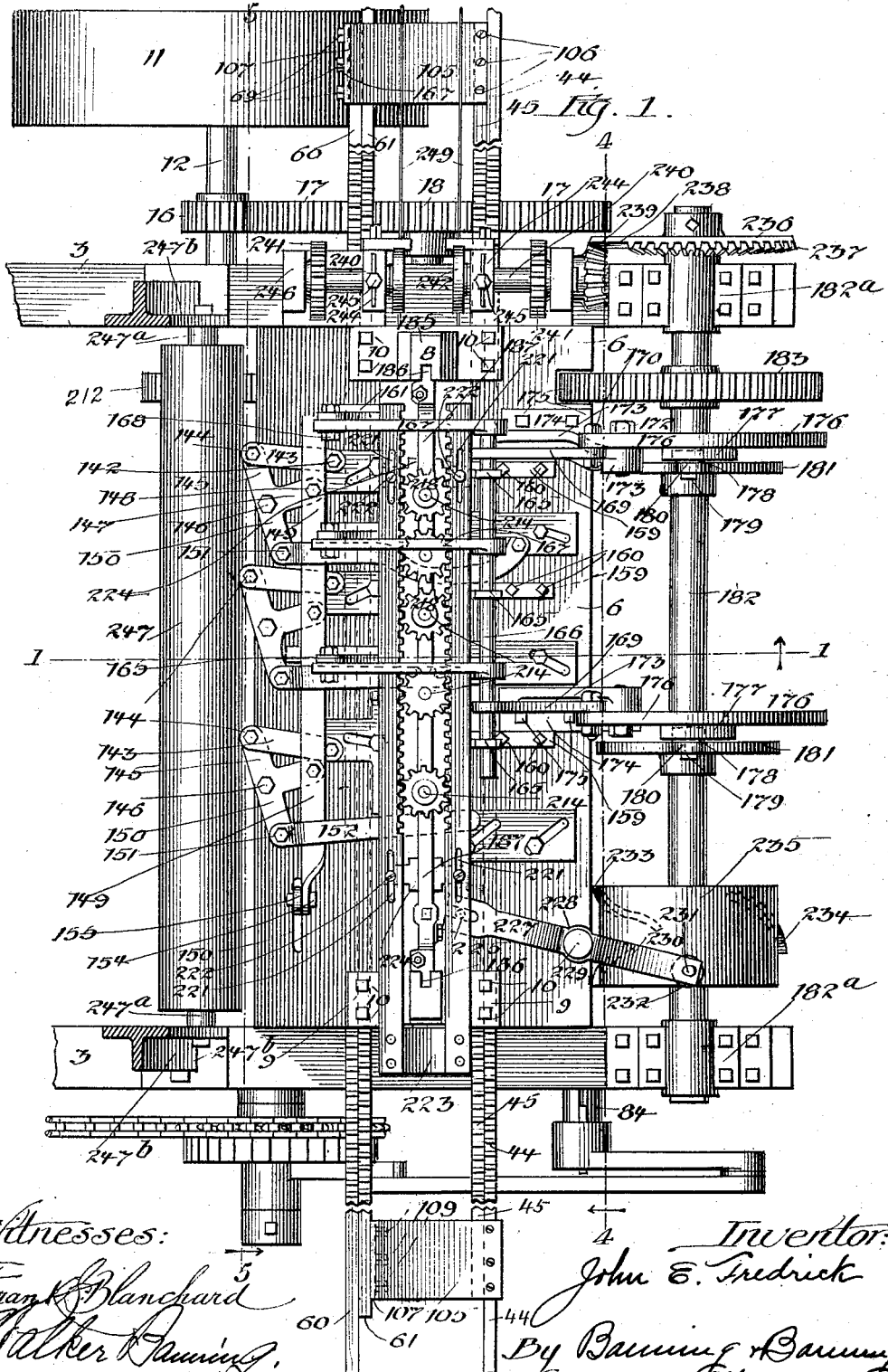

No. 772,231. PATENTED OCT. 11, 1904.
J. E. FREDRICK.
MACHINE FOR MAKING WIRE FENCES.
APPLICATION FILED NOV. 5, 1903.
NO MODEL. 8 SHEETS—SHEET 1.

Witnesses:
Frank Blanchard
Walker Banning

Inventor:
John E. Fredrick
By Banning & Banning
Attorneys

No. 772,231. PATENTED OCT. 11, 1904.
J. E. FREDRICK.
MACHINE FOR MAKING WIRE FENCES.
APPLICATION FILED NOV. 5, 1903.
NO MODEL. 8 SHEETS—SHEET 2.

Witnesses:
Frank E. Blanchard
Walker Banning

Inventor:
John E. Fredrick
By Banning & Banning
Attorneys.

No. 772,231. PATENTED OCT. 11, 1904.
J. E. FREDRICK.
MACHINE FOR MAKING WIRE FENCES.
APPLICATION FILED NOV. 5, 1903.
NO MODEL. 8 SHEETS—SHEET 3.

Witnesses:
Frank E. Blanchard
Walker Banning

Inventor:
John E. Fredrick.
by Banning & Banning
Attorneys.

No. 772,231. PATENTED OCT. 11, 1904.
J. E. FREDRICK.
MACHINE FOR MAKING WIRE FENCES.
APPLICATION FILED NOV. 5, 1903.
NO MODEL. 8 SHEETS—SHEET 4.

Witnesses:
Frank Blanchard
Walker Banning

Inventor:
John E. Fredrick
By Banning Banning
Attorneys.

No. 772,231. PATENTED OCT. 11, 1904.
J. E. FREDRICK.
MACHINE FOR MAKING WIRE FENCES.
APPLICATION FILED NOV. 5, 1903.
NO MODEL. 8 SHEETS—SHEET 5.
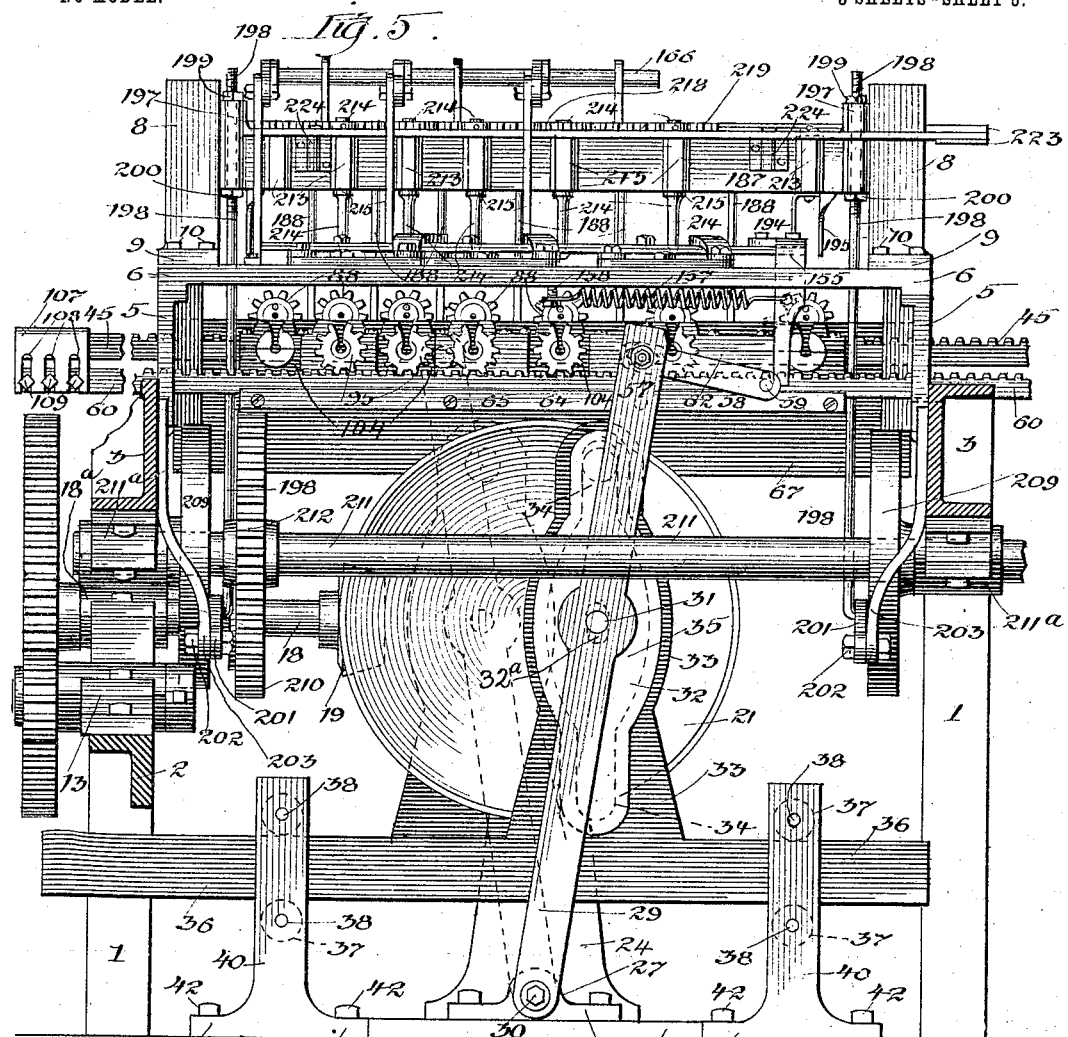

No. 772,231. PATENTED OCT. 11, 1904.
J. E. FREDRICK.
MACHINE FOR MAKING WIRE FENCES.
APPLICATION FILED NOV. 5, 1903.
NO MODEL. 8 SHEETS—SHEET 6.
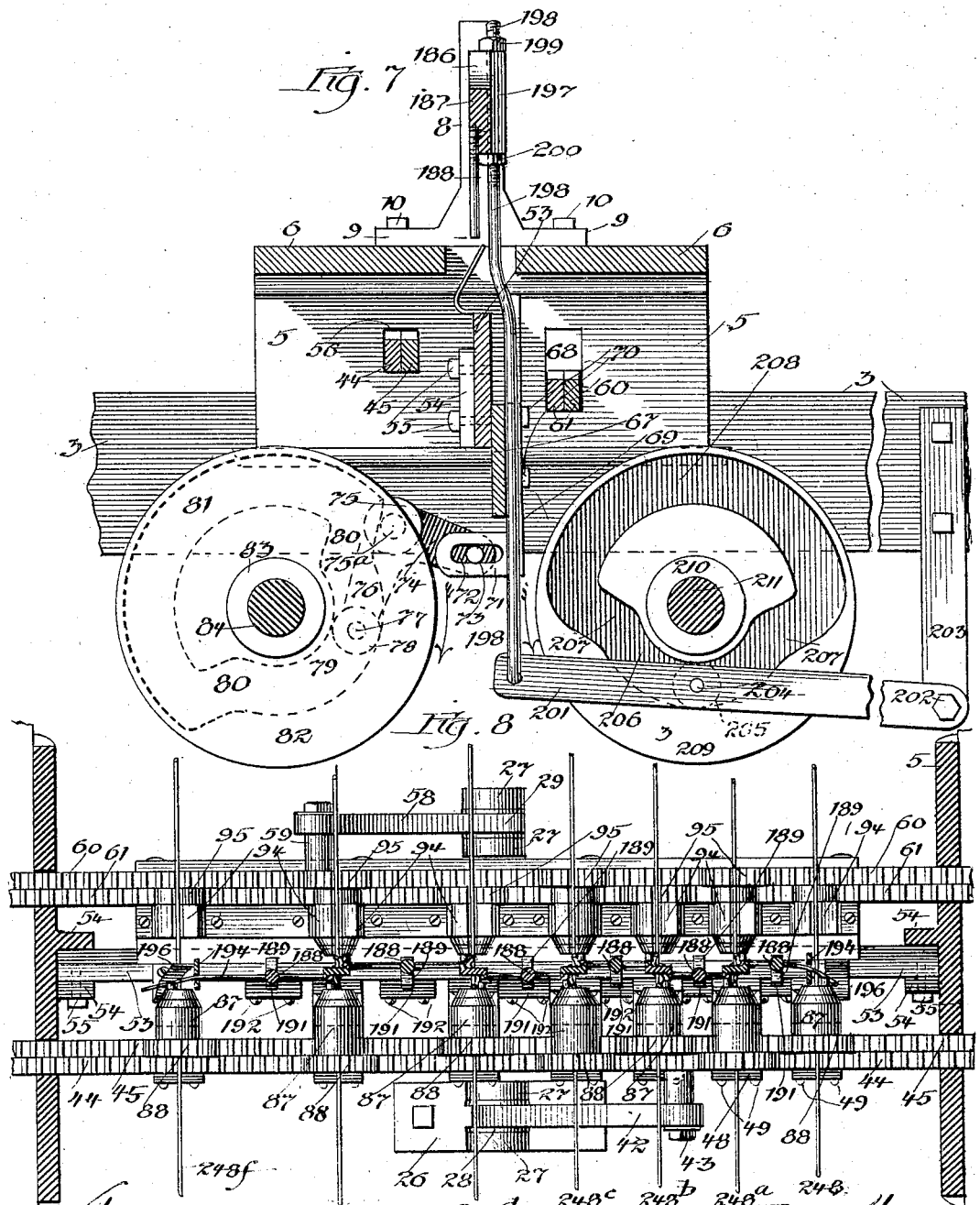

No. 772,231. PATENTED OCT. 11, 1904.
J. E. FREDRICK.
MACHINE FOR MAKING WIRE FENCES.
APPLICATION FILED NOV. 5, 1903.
NO MODEL. 8 SHEETS—SHEET 7.
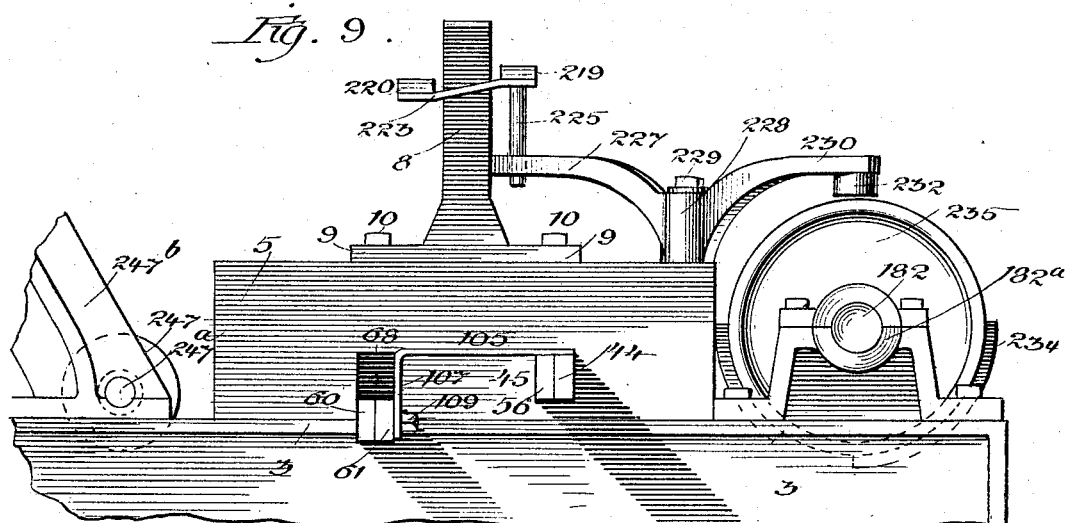
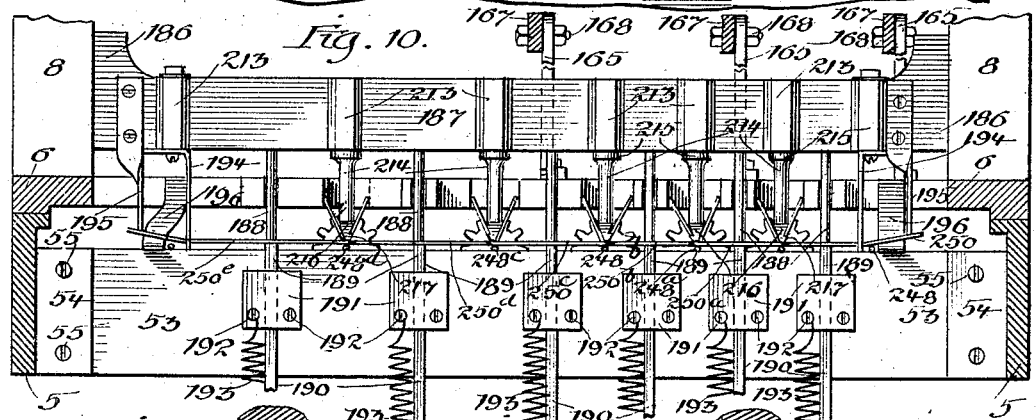
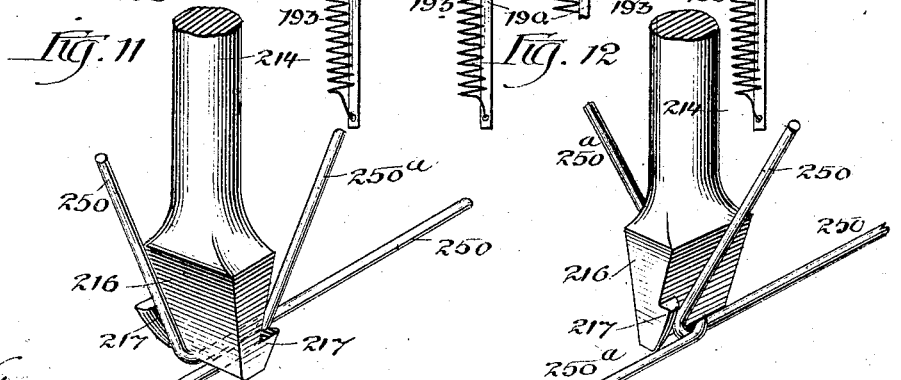
Witnesses:
Frank Blanchard
Walker Banning
Inventor:
John E. Fredrick
By Banning & Banning
Attorneys No. 772,231. PATENTED OCT. 11, 1904.
J. E. FREDRICK.
MACHINE FOR MAKING WIRE FENCES.
APPLICATION FILED NOV. 5, 1903.
NO MODEL. 8 SHEETS—SHEET 8.
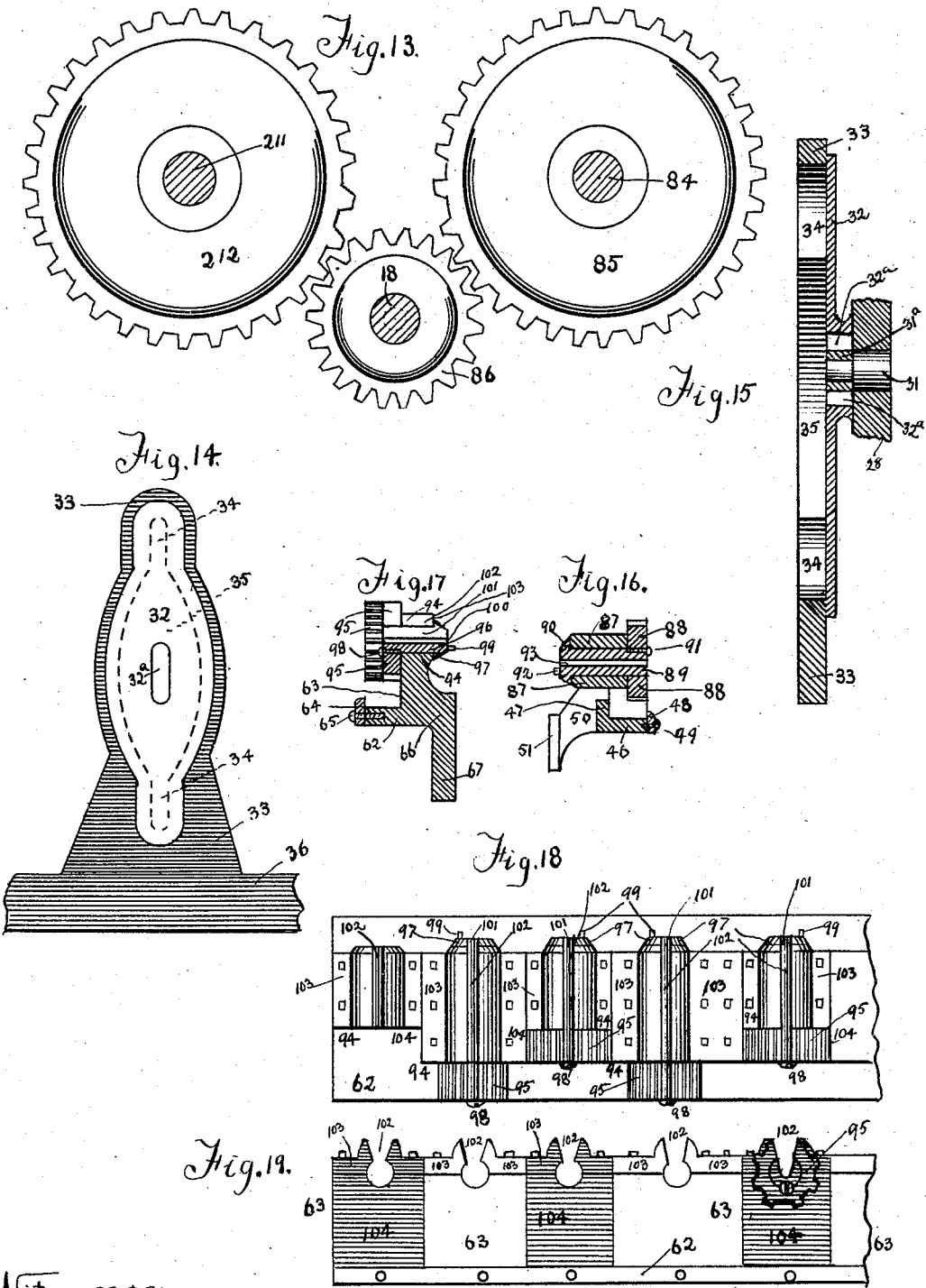

No. 772,231. Patented October 11, 1904.

UNITED STATES PATENT OFFICE.

JOHN E. FREDRICK, OF KOKOMO, INDIANA.

MACHINE FOR MAKING WIRE FENCES.

SPECIFICATION forming part of Letters Patent No. 772,231, dated October 11, 1904.

Application filed November 5, 1903. Serial No. 179,983. (No model.)

*To all whom it may concern:*

Be it known that I, JOHN E. FREDRICK, a citizen of the United States, residing at Kokomo, in the county of Howard and State of Indiana, have invented certain new and useful Improvements in Machines for Making Wire Fences, of which the following is a specification.

The machine is intended for use in making the type or style of wire fence having longitudinal or strand wires and vertical or stay wires crossing the strand-wires at right angles, the vertical or stay wires being in sections, each section having its ends coiled around the strand-wires, between which the section of the vertical or stay wire is located, and the adjacent ends of the sections of the vertical or stay wire on a longitudinal or strand wire interlocking with and abutting against each other and coiled around the longitudinal or strand wire in opposite directions or in the same direction of coiling.

The objects of the invention are to improve the driving means for actuating the mechanisms by which the vertical or stay wires are secured in place on the longitudinal or strand wires; to improve the means for reciprocating the driving-racks for the twisters, by which the ends of the sections of the vertical or stay wires are coiled or wound around the longitudinal or strand wires; to arrange the racks for driving the twisters of the vertical or stay wires in pairs, for each pair to have one of its racks on opposite sides of the longitudinal center of the machine and have the racks operated to give opposite directions of rotation to the twisters; in locating the twisters for the ends of the sections of the divided vertical or stay wires on opposite sides of the longitudinal center of the machine and arranging the driving-pinions for the twisters in different fore and aft planes to coact with the proper driving-rack by which they are rotated; to raise and lower the driving-racks and the twisters on the delivery side of the machine so as to leave a clear passage for the completed fence as the divided vertical or stay wires are secured in place; to furnish carriers or slides for advancing the vertical or stay wires into central position for the action of the twisting or winding devices; to sever the vertical or stay wires into sections of the proper length to bridge the space between the longitudinal or strand wires and leave each section with projecting ends to overlie the longitudinal or strand wire around which the section is to be coiled or wound at its ends; to support the vertical or stay wires in their central position and force the sections of the vertical or stay wires after being severed downward and bend and interlock their ends above the longitudinal or strand wires for the ends to be engaged by the final twisters and coiled or wound around the longitudinal or strand wires; to interlock and give an initial or start for the coil or wind for the ends of the sections of the divided vertical or stay wire by which the adjoining ends of two sections will be carried to opposite sides of the longitudinal or strand wire around which the ends are to be coiled or wound and into position for the action of the final twisters to complete the coiling or winding to actuate the initial twisters in opposite directions for interlocking the ends and giving an opposite coiling or winding of the ends of the sections of the vertical or stay wire around the longitudinal or strand wire; to furnish reciprocating racks, two on each side of the longitudinal center of the machine, to engage the pinions of the initial twisters, one rack operating one set of twisters in one direction and the other rack operating the other set of twisters in the opposite direction on the same side, and to improve generally the construction and operation of the several mechanisms which enter into the machine as a whole and the construction and formation of the produced fence.

The invention consists in the features of construction and combinations of parts hereinafter described and claimed.

Figure 2:
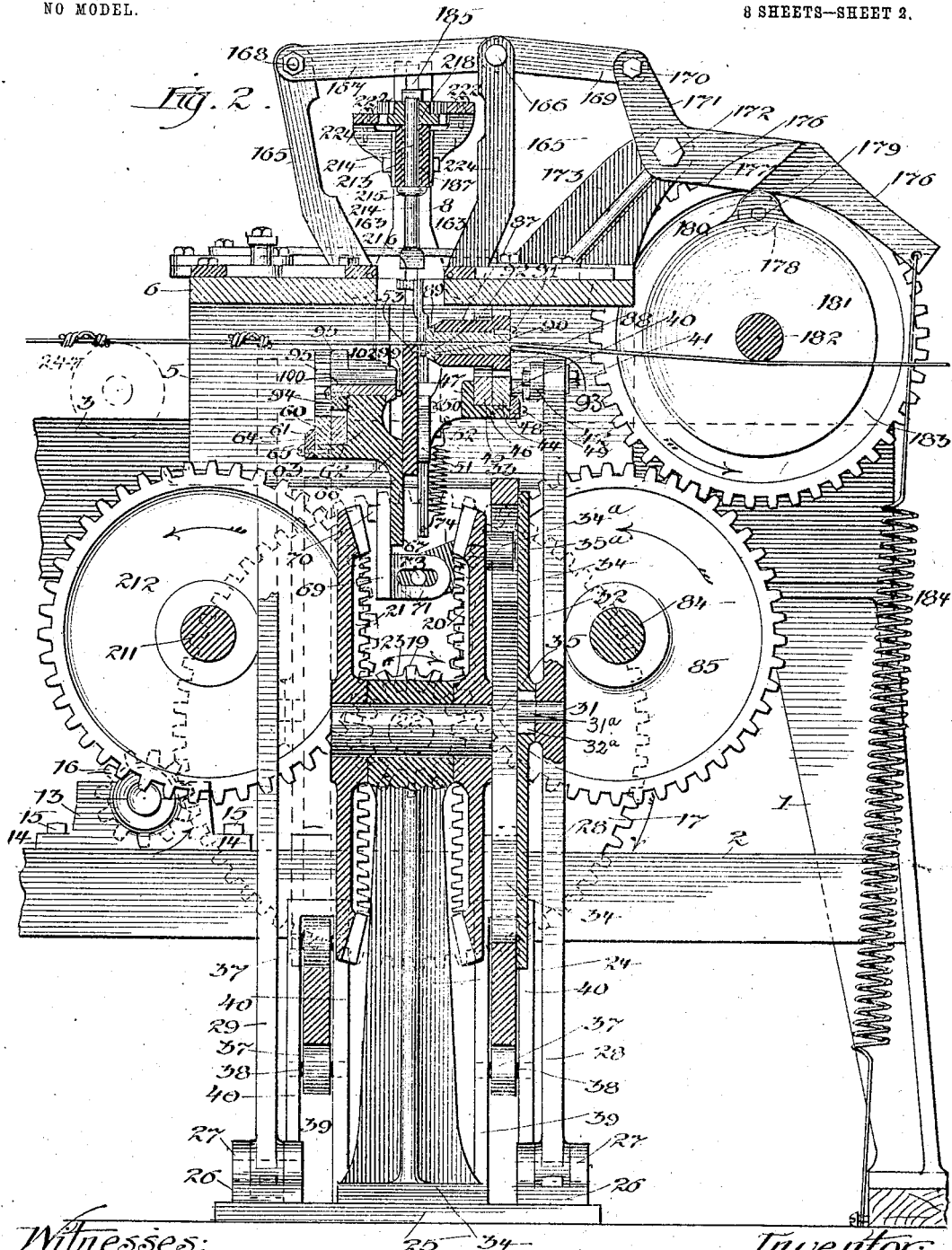
Figure 3:
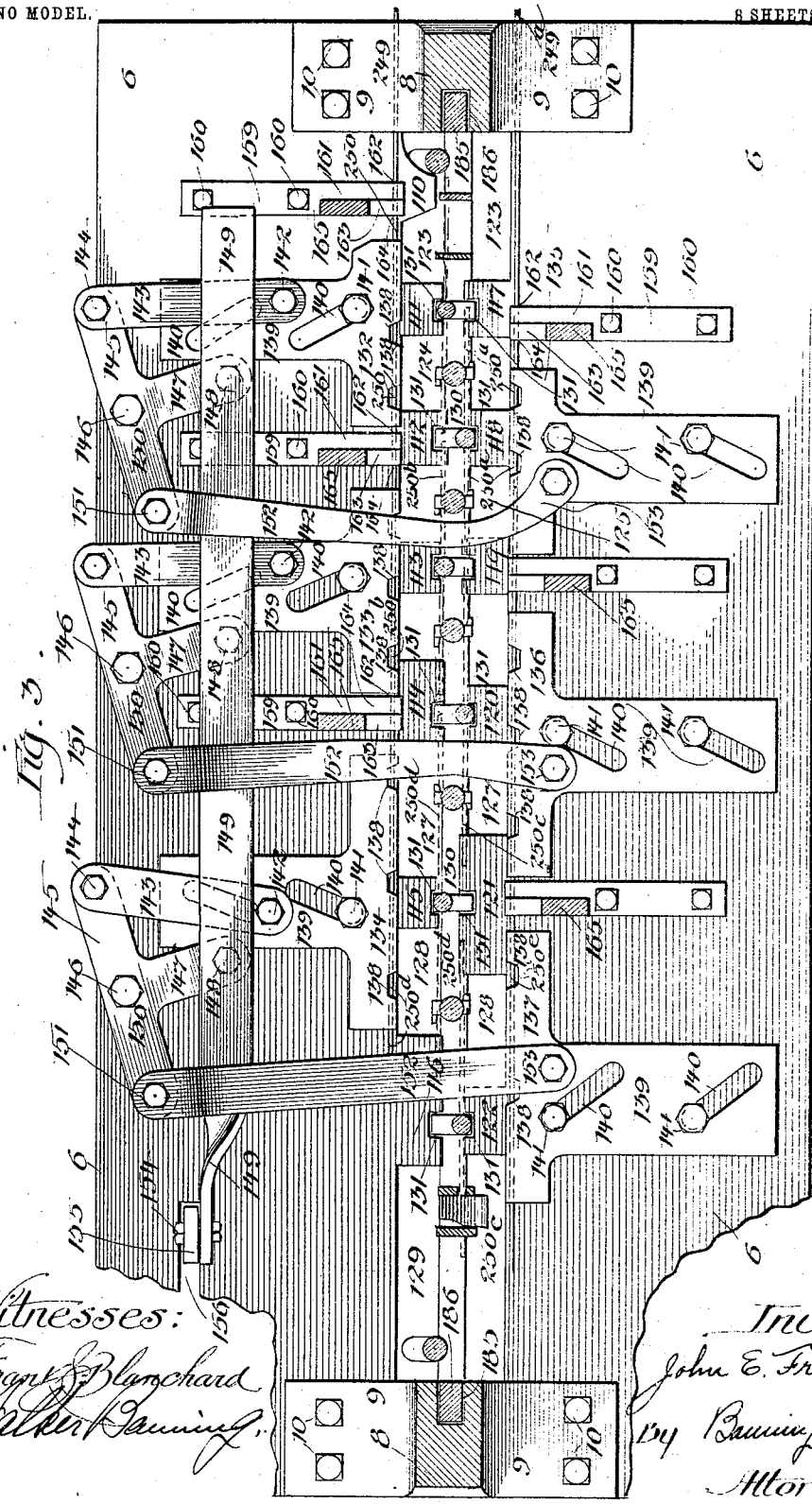
Figure 4:
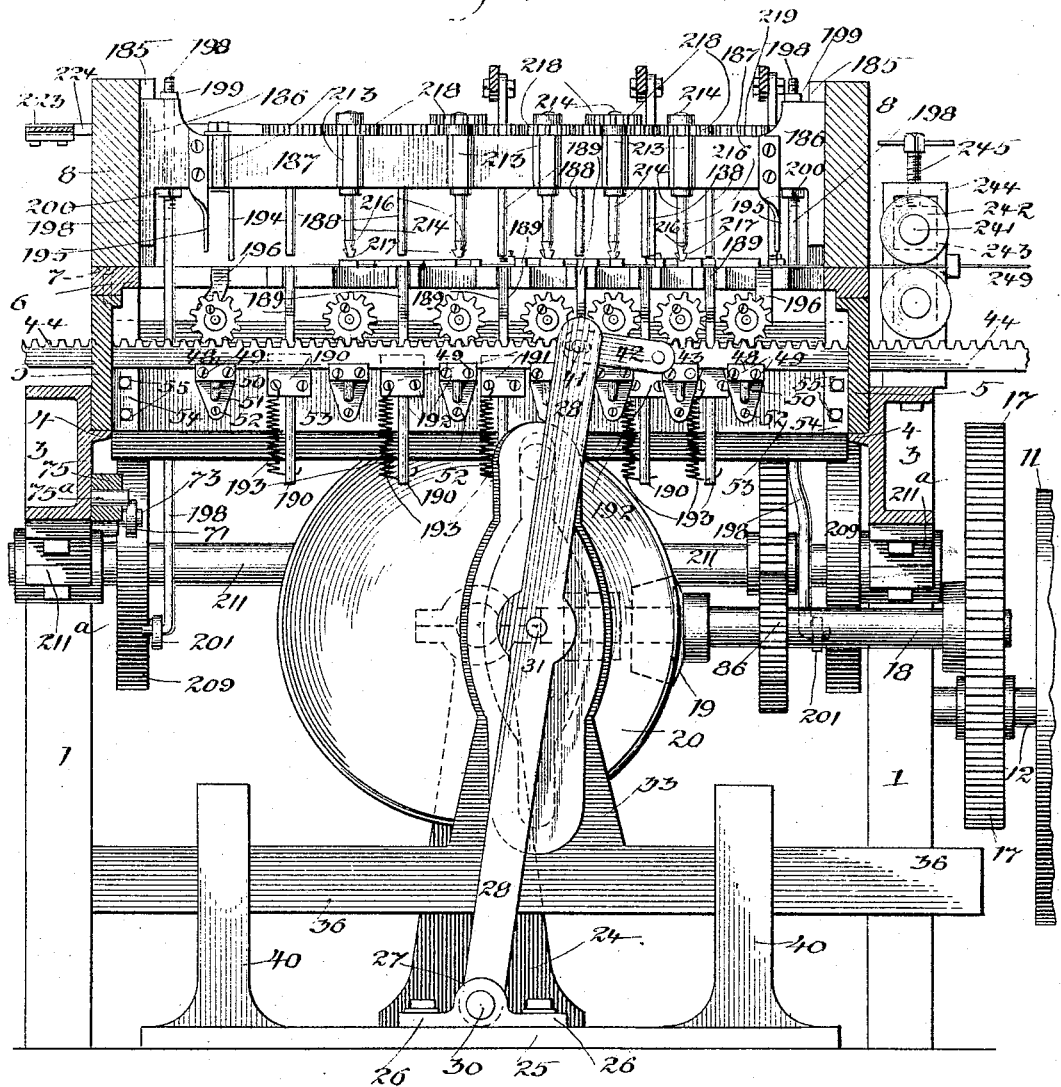

In the drawings, Figure 1 is a top or plan view of the machine, the racks for operating the main twisters being broken out and the frame on one side being broken off; Fig. 2, a section on line 1 1 of Fig. 1 looking in the direction of the arrow; Fig. 3, a top or plan view of the table, showing the carriers for advancing the vertical or stay wires into central position, the cutters for severing the vertical or stay wires into sections, the retainers or jaws for holding the vertical or stay wires centrally, and the devices for giving the initial or first twist or wind to the ends of the several sections of the vertical or stay wires, some of the parts being in section; Fig. 4, a longitudinal section on line 4 of Fig. 1 looking in the direction of the arrow and showing the entering side of the machine for the longitudinal or strand wires; Fig. 5, a longitudinal section on line 5 of Fig. 1 looking in the direction of the arrow and showing the delivery side of the machine; Fig. 6, an enlarged detail showing the initial twisters and the final or complete twisters; Fig. 7, a detail in sectional elevation of one end of the machine, showing the racks for the main or final twisters in section and showing the cams and connections for raising and lowering one division of the main racks and for raising and lowering the initial twisters and the upper holders or jaws for the vertical or stay wires; Fig. 8, a detail partly in section and showing a plan view of the main racks and the final twisters actuated from the racks and showing also the initial twisters and the holders or jaws for the vertical or stay wire; Fig. 9, a detail, being an end elevation of the parts shown; Fig. 10, a sectional elevation showing the sections of the vertical or stay wire depressed and the initial twisters in position to initially cross the ends of the sections of the vertical or stay wires, so as to interlock the ends before twisting or winding them finally around the longitudinal or strand wires; Fig. 11, a detail in perspective showing the position of the initial twisters and the position of the ends of the two sections of a vertical or stay wire at the start of the initial twisting or turning; Fig. 12, a similar view of Fig. 11, showing the position of the twister at the completion of the interlocking of the ends of two sections of a vertical or stay wire; Fig. 13, a detail showing the arrangement of the driving pinion and gear for revolving the side shafts; Fig. 14, a detail in elevation of one of the reciprocating or sliding plates for actuating the vibratable lever; Fig. 15, a sectional edge elevation of one of the slidable plates, showing the slot and roller connection between the plate and the vibratable lever; Fig. 16, a detail in sectional elevation of the fixed twister through which the strand-wires pass; Fig. 17, a detail in sectional elevation of one of the rising and falling twisters through which the strand-wires pass; Fig. 18, a top or plan view broken off at one end and showing the arrangement of the rising and falling twisters; and Fig. 19, a face elevation of the parts shown in Fig. 18.

The mechanisms which enter into the construction of the machine are supported or mounted on a suitable frame, which frame, as shown, consists of corner-legs 1, each having a foot by which it can be fastened to a floor or other support, and, as shown, the legs at one end are united by a cross-bar 2, and the companion legs at each end of the machine have secured to their tops, by bolts or otherwise, end rails 3, on which are supported the mechanisms for twisting or winding the ends of the sections of the vertical or stay wires around the longitudinal or strand wires. Each end rail 3 has on its inner face a ledge or flange 4, on which rests the lower edge of a supporting-plate 5, which plate is attached to its end rail, by suitable bolts or otherwise, and extends above the upper face of the end rail, as shown in Fig. 4. The end plates 5 support a table or platform 6, the ends of which rest on the upper face of the end plates and are secured to the end plates by screws 7 or in any other suitable manner, so as to be held firmly in position. At each end of the table or platform is a standard or upright 8, having a base 9, which is secured to the table or platform by bolts 10 or otherwise for the standards to be in the center longitudinally of the table or platform, as shown in Fig. 7.

At one end of the machine in the arrangement shown is a belt-pulley 11 on the end of a shaft 12, which shaft is mounted at its inner end in a journal-box 13, having a base 14, by which the journal-box as a whole is firmly secured in place by bolts 15 on the upper face of the end bar 2, as shown in Fig. 2. The shaft 12 has thereon a pinion 16, which meshes with a gear 17 on the end of a shaft 18, which shaft is mounted in a suitable journal-box $18^a$, attached to the under side of the end bar 2 or otherwise supported, and this shaft 18 extends inwardly below the table or platform 6 and at its inner end has a bevel-pinion 19, which meshes with bevel-gears 20 and 21, located on opposite sides of the bevel-pinion, as shown more particularly in Fig. 2. The bevel-gears 20 and 21 revolve on a common shaft 22, mounted in a suitable journal-box 23 on the upper end of a standard or upright 24, with the hubs of both gears on their inner faces engaging the faces of the journal-box holding the gears in place.

The standard 24 is formed with or secured to a base-plate 25, and on each side of the base-plate and on opposite sides of the standard 24 are plates 26, attached to the base-plate by bolts or otherwise and each having a pair of ears 27, as shown in Figs. 2 and 4. The ears 27 on one side receive between them the lower end of a vibratable lever 28, and the ears 27 on the opposite side receive between them the lower end of a vibratable lever 29, as shown in Fig. 2. The lower end of each lever 28 and 29 is pivotally mounted between the ears 27 by a pin or pivot 30, so that each arm or lever is free to be vibrated or oscillated. Each lever 28 and 29 has a contact pin or stud 31 laterally projecting from the lever and having thereon a roller $31^a$, which projects into a central slot $32^a$ in a plate 32, which plate lies adjacent to and is integral with a slidable plate 33, in which is a slot or opening having a straight portion 34 at each end and an oval central portion 35 between the two ends, as shown in Figs. 2, 4, and 5. Each bevel-gear 20 and 21 has on its outer face a roller 34ª, mounted on a pin 35ª, which roller projects into the opening of the adjacent plate 33, so that with the rotation of each gear the plate 33 will be carried to and fro, giving a corresponding movement to the plate 32 and transmitting an oscillating or vibrating movement to the upper end of each lever 28 and 29, but in opposite directions. Each plate 33 projects upwardly from a bar 36, which bar is carried between rollers 37, mounted on journal-pins 38 and located in a slot 39 of a yoke-support 40, formed with or suitably secured to the base-plate 25, a standard with rollers being provided at each end of the base-plate, as shown in Figs. 2, 4, and 5. The bar 36 on each side is held by the rollers 37, so as to have a straight-line travel to and fro, giving each plate 33 a straight-line to-and-fro travel correspondingly, and this travel is derived from the rotation of the bevel-gears 20 and 21 through the engagement of the roller 34ª with the opening 34 35 in the plate 33, and the travel is limited in both directions by the passage of the roller 34ª from the straight end 34 of the opening into the circular or oval portion 35 of the opening, the plate and bar having a straight-line movement while the roller 34ª is engaged with the straight ends 34 of the opening and having no movement while the roller 34ª is passing through the circular or oval portion 35 of the opening. The upper end of the lever 28 has a pivot or pin 41, which projects into a seat in one end of a link 42, the other end of which is connected by a pivot or pin 43 with a rack-bar 44, so that with the vibration or oscillation of the upper end of the lever 28 the rack-bar 44 will be given a reciprocating movement. A rack-bar 45 is located adjacent to the rack-bar 44, but has no connection with the rack-bar 44, and has an opposite reciprocating movement given thereto, as hereinafter described. The rack-bars 44 and 45 are located below the table or platform 6 and extend crosswise of the machine or endwise of the table or platform and project at each end beyond the ends of the frame, as shown in Fig. 1. The rack-bars 44 and 45 are supported on brackets, each bracket having a bottom plate 46 and an inner flange or plate 47, and the rack-bars are held in place by a front plate 48, attached to the bottom plate 46 by screws 49 or otherwise, as shown more particularly in Fig. 2. Each bracket has an arm 50 terminating in a plate 51, and each plate 51 is attached by screws 52 or otherwise to a bar or plate 53, having its ends entered between ears 54 on the standard plate 5 and held at each end between the ears 54 by bolts 55 or otherwise, as shown in Figs. 4, 5, 7, and 8, and the rack-bars pass through an opening 56 in each end plate 5, as shown in Fig. 7.

The lever 29 at its upper end has a pin or pivot 57, which projects into a slot in one end of a link 58, the other end of which is connected by a pin or pivot 59 with a rack-bar 60, so that with the vibration or oscillation of the upper end of the lever 29 the rack-bar 60 will be reciprocated. A rack-bar 61 is located adjacent to and inside of the rack-bar 60, but has no connection with the rack-bar 60, and has given thereto an opposite reciprocation to the rack-bar 60 and coincident with the reciprocation of the rack-bar 44, while the rack-bar 60 has a reciprocation coincident with the reciprocation of the rack-bar 45—that is to say, when the rack-bars 44 and 61 are traveling in one direction the rack-bars 45 and 60 are traveling in the opposite direction. The rack-bars 60 and 61 are supported in a channel formed by a base-plate 62, a back plate 63, and a front plate 64, the front plate being secured to the bottom plate 62 by screws 65 or otherwise, as shown in Fig. 2, so that the rack-bars are free to travel to and fro in their support. The back plate or head 63 is connected by a neck 66 with a plate 67 adjacent to the plate or bar 53 and free to slide vertically up and down on the plate or bar 53 as a guide or backing, and with the vertical rise and fall of the plate 67 the rack-bars 60 and 61 will be raised and lowered accordingly. The rack-bars 60 and 61 are located below the table 6 and project at each end beyond the end plate 5, passing through an opening 68 in each end plate 5, which opening is of sufficient height to allow of the rising-and-falling movement which is given to the rack-bars as the plate 67 rises and falls.

At each end of the plate 67 is a pendant 69, attached to the plate 67 by a bolt 70 or otherwise, and each pendant 69 has extending out therefrom at its lower end an ear 71, having a slot 72, into which projects a pin 73, extending out from the end of an arm 74 of a bell-crank lever, which lever has a hub or bearing 75, mounted on a journal-pin 75ª, extending out from the end rail 3 of the frame, as shown in Figs. 4 and 7. The other arm, 76, of the bell-crank lever has a journal-pin 77 at its end, on which is mounted a roller 78, which travels in a cam-groove consisting of a short circle 79, straight ends 80, and a large circle 81, which groove is formed in a disk 82, as shown in Fig. 7. The disk 82 has its hub 83 fixedly mounted on a shaft 84, which shaft is mounted in suitable journal-boxes attached to the under side of the end rail 3 and has fixedly mounted thereon a gear 85, which meshes with a pinion 86 on the shaft 18, as shown in Figs. 4 and 13. The rotation of the pinion 86 drives the gear 85, revolving the shaft 84, carrying with it the disk 82, and as the disk 82 revolves the roller 78, through its engagement with the circular and straight portions 79, 80, and 81 of the cam-groove, oscillates the bell-crank lever, causing the arm 74 of said lever, through the pin 73 and the ear 71, to raise and lower the plate 67 in the passage of the roller through the straight sections 80 of the groove, holding the plate raised while the roller passes through the circular section 81 of the cam-groove and holding the plate depressed while the roller passes through the circular section 79 of the cam-groove, giving a rising-and-falling movement and a stoppage or rest to the rack-bars 60 and 61, by which the rack-bars when raised are brought into operative position and when lowered are in a non-operative position.

Each bracket arm or web 50 extends above the back plate 47 of the channel or runway for the rack-bars 44 and 45, as shown in Fig. 2, and the upper extension of each bracket-arm has formed therewith or secured thereto a shell or casing 87, made in two halves or sections, the inner end of which, as shown, is beveled and against the outer end of which abuts a pinion 88, and each pinion 88 encircles and is attached to the outer or butt end of a sleeve 89 of a twister. Each sleeve 89 at its inner end has a flange or head 90, forming a shoulder which abuts against the end face of the casing 87, and the pinion 88 is attached to the outer end of its sleeve 89 by a screw or key 91, as shown in Figs. 2 and 16, so that as the pinion is rotated the sleeve will be rotated. Each sleeve has projecting from its inner end a twisting-pin 92, and each sleeve has through its longitudinal center a hole 93 for the passage of a longitudinal or strand wire. The casings 87 are of two different lengths, and the sleeves 89 are also of two different lengths. The long-length casings and sleeves have a length sufficient to bring the pinions 88 for the sleeves in line with the rack-bar 44 and the short-length casings and sleeves have a length sufficient to bring the pinions 88 in line with the rack-bar 45, and the long and short length casings and sleeves alternate, so that a short-length casing and sleeve and pinion will be between a long-length casing and sleeve and pinion, as shown more particularly in Figs. 8, 18, and 19, with the result that inasmuch as the rack-bar 44 moves in one direction and the rack-bar 45 moves in the opposite direction the twisting-sleeves, with their twisting-pins, will be given opposite directions of rotation, those having the long sleeve and actuated from the rack-bar 44 turning in an opposite direction from those having the short sleeve and actuated from the rack-bar 45, by which arrangement the ends of the sectional vertical or stay wire are wound in opposite directions around the longitudinal or strand wires.

The back plate or wall 63 of the channel-support for the rack-bars 60 and 61 has formed therewith or secured thereto a series of casings 94, made in two halves or sections, each casing at its inner end having a tapered formation, as shown, and each casing has abutting against its outer face a pinion 95, and each pinion encircles and is attached to a sleeve 96, mounted in the casing. Each sleeve 96 at its inner end has a head 97, forming a shoulder which abuts against the inner end face of the casing, and the pinion is attached to its sleeve by a screw or key 98, so that when the pinion is attached the sleeve is held against endwise movement in the casing, which is also true of the sleeves 89. The head 97 of each sleeve 96 has a projecting twisting-pin 99, and each sleeve has a central longitudinal hole 100 for the reception of a longitudinal or strand wire. Each sleeve 96 has therein a longitudinal slot 101, extending from the hole 100 to the exterior of the sleeve in a straight line, and each casing 94 has in its upper side a vertical longitudinal slot 102, which when the slot 101 is in alinement therewith allows the longitudinal or strand wire to enter and be withdrawn from the hole 100 of the sleeve, for which purpose the pinion 97 is slotted in line with the slot 101 of the sleeve. The casings 94 are of long and short lengths, and the sleeves 96 are also of long and short lengths correspondingly, and, as shown, the casings are made in halves or sections, one section being formed with the plate or head 63, and the other section, 103, being attached thereto by bolts or screws or otherwise, and in order to allow of the projection of the casings and sleeves of the greater length openings 104 are provided for the insertion of the short sleeves in their casings, as shown in Figs. 5, 18, and 19. The sleeves of the greatest length each has its pinion 95 arranged to engage with the rack 60, and the shorter sleeves each has its pinion 95 arranged to engage with the rack 61, and the arrangement of the long and short casings and sleeves is one to bring a short casing and sleeve between two long casings and sleeves, as shown in Fig. 8. The sleeves, with their twisting pins, are given opposite rotations by reason of the opposite travel of the racks 60 and 61—that is to say, the long sleeves operated from the rack-bar 60 will rotate in the opposite direction from the short sleeves operated from the rack 61—by which means the ends of the sections of a divided vertical or stay wire are wrapped or coiled in opposite directions around the strand-wires, and the direction of coiling or wrapping for the ends of the sections of a divided vertical or stay wire will be in opposite directions for the twisters on opposite sides of the vertical bar or plate 53—that is to say, the short sleeve-twisters on one side of the bar or plate 53 will wind in the opposite direction to the short sleeve-twisters on the other side of the plate or bar and the long sleeve-twisters on one side of the plate or bar will wind in the opposite direction to the long sleeve-twisters on the opposite side of the plate or bar—and this manner of wrapping or coiling the ends of the sections of the divided vertical or stay wire around the longitudinal or strand wires insures an interlocking of the coils or wraps and the bearing of one coil or wrap against its companion coil or wrap on the same longitudinal or strand wire by which the sections of the vertical or stay wire will be held in place and retained against slipping on the longitudinal or strand wire and getting out of alinement, thus insuring a straight line of run for the vertical or stay wires and guarding effectually against end displacement of the several sections of a vertical or stay wire when once secured to the longitudinal or strand wires.

The rack-bar 44 is connected with the rack-bar 61 by a plate 105, one end of which is attached to the rack-bar 44 by screws 106 or otherwise, and the other end of which is bent at right angles, forming an end 107, which has therein vertical slots 108 for the passage of screws 109, by means of which the plate 105 is loosely connected to the rack-bar 61, permitting the rack-bar 61 to rise and fall. The rack-bar 45 is connected with the rack-bar 60 by a similar plate 105, one end of which plate is connected by screws 106 or otherwise to the rack-bar 45, and the other end of which has its turned end 107 connected by the slots 108 and bolts 109 loosely with the rack-bar 60, as shown in Figs. 1 and 5. The rack-bars, it will thus be seen, are arranged in pairs, one pair comprising the rack-bar 44 and the rack-bar 61 and the other pair comprising the rack-bar 45 and the rack-bar 60, and of the pairs the rack-bars 44 and 45 have substantially a fixed relation against rising and falling, while the rack-bars 60 and 61 are free to rise and fall; but at the same time the transverse or reciprocating movements of the rack-bars 44 and 61 will be in unison, and the transverse or reciprocating movements of the rack-bars 45 and 60 will be in unison. The rack-bars 44 and 45 are always in engagement with the pinions 88 of the twister-sleeves 89, with the result that the twister-sleeves are revolved in both directions with the reciprocating movements of the rack-bars. The rack-bars 60 and 61 engage with the pinions 95 of the twister-sleeves 96 at all times, so that the twisters are rotated in opposite directions with the travel of the rack-bars; but the twisters are only operative when the rack-bars and the twisters are raised or in their elevated position, with the longitudinal or strand wire entered into the hole 100 of its twister-sleeve, during which time the ends of the sectional vertical or stay wire are coiled or wrapped around the longitudinal or strand wire, and with the drop of the racks and the twisters into their lowermost position the strand-wires pass from the slots of the twisters and their casings and lie above the twisters, as shown in Fig. 2, thus permitting of the advance of the fence as a whole after the attachment of the vertical or stay wires to the longitudinal or strand wires.

The plate 6 is cut out at the center when made of a solid piece, or, if made of two pieces, cut out at the inner edge of each piece, so as to form abutments 110, 111, 112, 113, 114, 115, and 116 on one edge of the plate, and abutments 117, 118, 119, 120, 121, and 122 on the opposite edge of the plate. The abutments on one side have spaces 123, 124, 125, 126, 127, 128, and 129 between them, and the abutments on the opposite edge of the plate have corresponding openings, except that the opening 123 extends from the abutment 117 to the end of the plate, while the opposite edge of the plate has the opening 123 interrupted by the abutment 110. The openings 123, 124, 125, 126, 127, 128, and 129 are not of the same length for the two edges of the plate in some instances. The openings 124 are of equal length and in line, the openings 125 are of unequal length, the openings 126 are of unequal length and a little out of line, the openings 127 are of equal length and still more out of line than the openings 126, the openings 128 are of unequal length to a slight extent and nearly half-way out of line, and the openings 129 are of unequal length and slightly out of line to the limit of the extra length of one opening. The abutments have between them a continuous slot or opening 130, which is at the center endwise longitudinally of the plate, with its center equidistant from the end face of the several abutments, and each abutment has in its inner face a slot or opening 131 for the operation of the retainers or holders of the vertical or stay wires when projected into central position after being cut into sections for the purpose of having their ends wrapped around the longitudinal or strand wires. The table or platform 6 on one side has mounted thereon carriers or slides 132, 133, and 134, and the opposite side of the plate has mounted thereon carriers or slides 135, 136, and 137, the two sets of carriers being arranged in staggered relation to each other and not directly opposite each other, though in the same horizontal plane fore and aft. The under face of each carrier has therein a recess 138 opening downwardly, and the acting edge of each carrier has therein notches 138$^a$, the companion carriers 132 and 135 each having two notches, the companion carriers 133 and 136 each having three notches, and the carrier 134 having three notches, with its companion carrier 139 having two notches, in the construction and arrangement shown. Each carrier or slide has an arm 139, in which is a diagonal slot 140, the slots for the respective companion carriers running in opposite diagonal directions and the slot in the carrier 134 having a diagonal opposite run to the slot in the carriers 132 and 133, and the slots in the carrier 139 have an opposite diagonal run to the slots in the carriers 135 and 136, as shown in Fig. 3. Each carrier or slide is attached to the table or platform, so as to be free to slide forward and backward, by a bolt 141 passing through each slot 140, giving the carriers or slides a movement forward and backward on diagonal lines. The plate or arm of each carrier has connected thereto by a pin or pivot 142 one end of a link 143, the other end of which is connected by a pin or pivot 144 to a side arm 145 of a T or double bell-crank lever, and each bell-crank lever is pivotally mounted on the bed-plate or platform 6 by a suitable pin or pivot 146 and has its body-arm 147 attached by a pin or pivot 148 to a reciprocating bar 149, located above the stems or arms 139 of the carrier, as shown in Fig. 3. This connection applies to one set of carriers or slides for moving the carriers or slides simultaneously forward and backward. Each T or double bell-crank lever has its other side arm, 150, connected by a pin or pivot 151 with one end of a link 152, the other end of which link is connected by a pin or pivot 153 with a carrier or slide of the opposite set, so that with the advance of the carriers or slides actuated by the arm 145 of the double bell-crank lever the companion carrier or slide of the opposite side will be advanced by the arm 150 of the double bell-crank lever through the connecting-links 143 and 152, the link on one side traveling forward to advance its carrier or slide and the link on the opposite side traveling backward to advance its carrier, thus giving the two companion carriers a simultaneous advance and likewise a simultaneous recession. The reciprocating bar 149 at one end is connected by a pin or bolt 154 with the upper end of a pendant 155, which end of the pendant extends up through a slot 156 in the bed-plate or platform 6, and its opposite end is contacted by the upper end of the vibratable lever 57, so as to be advanced by the lever, and, as shown, a spring 157 is connected at one end with the pendant 155 and its other end is connected to a pin or stud 158 and serves to return the bar 149 to normal position after each advance of the carriers or slides.

The bed-plate or platform 6 on its upper face and on each side of the central opening therein has fixed thereto a series of cutters, three being shown for each side of the opening. Each cutter consists of a body 159 attached to the bed-plate or platform 6 by bolts 160 or otherwise and a cutting-section 161, in the extreme end of which is a hole 162 for the passage of the vertical or stay wire on each side and with which the recess 138 of the carriers aline when the carriers are receded. A movable cutter is provided for each fixed cutter, and each movable cutter consists of a head 163, having therein a hole 164 for the passage of the vertical or stay wire and opening to the front or toward the bed-plate opening, and each head has a stem or body 165 upwardly extending. The stems or bodies 165 of the movable cutters on one side are attached at their upper ends to a rock-shaft 166, and the rock-shaft 166 has fixed thereon one end of a series of links 167, a link being provided for each body or stem of the movable cutters on the opposite side and each link being connected with the upper end of its body or stem by a bolt or pivot 168, so that the rocking of the shaft 166 will simultaneously operate all six of the movable cutters. The rock-shaft 166 has fixedly connected therewith the ends of two links 169, and the opposite end of each link 169 is connected by a bolt or pivot 170 with the arm 171 of a bell-crank lever pivotally supported by a pin or pivot 172 on the end of a standard 173, having a flange 174 at its lower end, by means of which and bolts 175 each standard is attached to the upper face of the bed-plate or platform 6, and the standards are so located as to make the attachment for the links adjacent to each end of the rock-shaft, as shown in Fig. 1. The other arm, 176, of the bell-crank lever has thereon a cam 177, which is contacted by a roller 178, mounted on a journal or pin 179, projecting out from an ear 180 on a disk 181, fixedly mounted on a shaft 182, a disk with a roller being provided for the arm 176 of each bell-crank lever. The shaft 182 is mounted in suitable journal-boxes 182$^a$ on the upper side of the end rails 3 and has fixed thereon a gear 183, which meshes with and is driven by the gear 85 in the arrangement shown. The rotation of the shaft 182 revolves the disk 181 and brings the roller 178 in contact with the inclined face of the cam 177, raising the arm 176 of the bell-crank lever and carrying down the outer end of the arm 171 of the bell-crank lever, causing the links 169 to rock the shaft 160, rocking one set of movable cutters direct from the rock of the shaft on one side and rocking the cutters of the other set on the opposite side simultaneously through the connecting-links 167 between the rock-shaft and the stems or bodies of the cutters on that side, and after the roller has passed the incline the cutters are returned to normal position by the action of a spring 184, one end of which is attached to the arm 176 of the bell-crank lever and the other to the support of the arm or otherwise. Each standard or upright 8 has in its inner face a slot or guideway 185, into which is entered the end 186 of a vertically-standing bar 187 for the bar to be free to slide up and down. The bar 187 has entered into its under edge the upper ends of a series of rods 188, constituting the upper section of a holder or clamp for the vertical or stay wires, and these rods 188 coact with a series of heads 189, arranged in line with the rods and forming the under section of the holder or clamp. Each head 189 is carried by a stem 190, which is free to slide in a plate 191, attached to the plate or bar 53 by screws 192 or otherwise, so that with the descent of the bar 187 the rods 188 are carried down, the heads 189 and their stems 190 bringing the vertical or stay wires into a plane just above that of the longitudinal or strand wires, and with the ascent of the bar 187 and rods 188 the heads are returned to normal position to be in the plane of the upper face of the bed-plate or platform by springs 193, a spring being provided for each stem 190, attached at one end to the stem and at the other end to a screw 192 or otherwise, so that the tension of the spring will be sufficient to return the head. At each end of the bar 187 is a blade 194, and each blade 194 has a companion blade 195 with a space between them, into which space when the bar 187 is down projects the upper end of a curved plate 196, and these blades and plate are for the purpose of upwardly bending the outer ends of the top and bottom sections of the vertical or stay wires to be coiled or wrapped around the top and bottom longitudinal or strand wires. Each head or end 186 of the bar 187 has thereon a socket 197, through which passes the upper end of a rod 198, and this upper end of the rod is screw-threaded and has thereon a locking-nut 199, which abuts against the upper end of the socket, and a stop or jam nut 200, which abuts against the lower end of the socket, by means of which nuts the rod can be properly adjusted as to length for raising and lowering the bar 187 and the devices carried thereby the required distance for the devices to operate properly on the vertical or stay wires. The lower end of each rod 198 is connected with the end of a lever 201, the other end of which lever is attached by a pivotal bolt 202 to the end of a pendant 203 or otherwise secured to the end rail 3 of the arm. Each lever 201 has projecting therefrom a journal-pin 204, on which is a roller 205, which enters a cam-groove having a small circle section 206, a straight section 207 on each side, and a large circle section 208, which cam-groove is formed in a disk 209, the hub 210 of which is fixedly attached to a shaft 211, mounted in suitable bearings 211ª on the under side of the end rails of the frame, and on the shaft 211 is a gear 212, which meshes with the pinion 86 on the shaft 18, so that with the revolving of the shaft 18 the pinion drives the gear 212, turning the shaft 211 and revolving the cam-disk 209 for the cam-groove of the disk as it travels around to cause the roller 205 to raise and lower the outer end of the lever 201, giving the rod 198 an upward and downward thrust by which the bar 187 will be raised and lowered.

The bar 187 has a series of sockets or bearings 213, each of which receives the upper end of a stem 214, each stem having thereon a shoulder 215 to abut against the under face of the socket or bar. The lower end of each stem has a cross-head 216, and each cross-head has on its opposite side faces a lip 217, which lips are for the purpose of engaging the to be turned and wrapped ends of the sections of the vertical or stay wires and interlock such wires before the ends are coiled or wrapped around the strand-wires. The form of the head 216 and lip 217 is shown particularly in Figs. 11 and 12, which figures also show the position of the ends of two sections of a vertical or stay wire before being interlocked in Fig. 11, and in Fig. 12 show the ends of the two sections of the wire after being interlocked. The upper portion of each stem 214 extends above the top of the bar 187 and has secured thereto a pinion 218, and the pinions 218 are arranged to occupy different vertical planes, making, in effect, two series of pinions, one set in a lower plane and the other set in a higher plane in relation to the top of the bar. The higher set of pinions engage with a rack-bar 219, and the lower set of pinions engage with a rack-bar 220, the two rack-bars occupying different vertical planes. Each rack-bar 219 and 220 has therein slots 221, through which pass headed pins or bolts 222, which permit the rack-bars to be reciprocated, and the rack-bars at one end are united one to the other by a cross-bar 223, so that both racks will move as one. The rack-bars 219 and 220 are supported on brackets 224, attached to the sides of the bar 187 on each side thereof, into which brackets the headed pins or bolts 222 enter. The rack-bar 219 has depending from its under side a pin 225, which enters a slot 226 in the end 227 of a vibratable lever, which lever has a central hub 228, through which passes a stud or pin extending up from the bed-plate or platform 6 and furnishing a pivotal mounting for the lever, and the other arm or end, 230, of the arm or lever has a projecting journal 231, carrying a roller 232, which is engaged by cam-flanges 233 and 234 on the periphery of a roller 235, fixedly mounted on the shaft 182, so that as the shaft revolves the roller will revolve therewith and cause the cam-flanges 233 and 234 to engage the roller 232 and vibrate the lever, for the arm 237 as it moves in one direction to advance the racks 219 and 220 and as it moves in the opposite direction to recede the racks 219 and 220 for the racks to give a rotation to the stems 214 in both directions, causing the heads of the stem to interlock the ends of the sections of the vertical or stay wires and after interlocking the ends to initially turn backwardly and then return to normal position for the next operation.

One end of the shaft 182 has fixed thereon a gear 236, having bevel-cogs 237 for a portion of its circle and a plain face 238 for the remainder of its circle. The bevel-gear, as to the cog-section thereof, engages with a bevel-pinion 239 on the end of a shaft 240, on which is a pinion 241 and to the end of which is secured a feed wheel or disk 242, and the end of the shaft 240 adjacent to the feed wheel or disk is mounted in an adjustable box 243 in a standard or upright 244 and engaged by the end of a screw-threaded stem 245 for adjusting the shaft 240 to properly set the feed wheel or disk, and the end of the shaft adjacent to the bevel-pinion 239 is mounted in a box located in a standard or upright 246. The feed-disk 242 and the parts just described, except as to the bevel gear-pinion, are duplicated for the opposite side of the machine, as shown in Fig. 1, thus providing a pair of feed wheels or disks for each wire of the vertical or stay wire. A roller 247 is located on the delivery side of the machine, over which the completed fence passes, and this roller has its journal 247$^a$ mounted in the lower ends of standards 247$^b$, which standards furnish a support for other feed-rollers, (not shown and forming no part of the present invention.)

The machine shown is adapted for making a fence having seven longitudinal or strand wires, (indicated by 248, 248$^a$, 248$^b$, 248$^c$, 248$^d$, 248$^e$, and 248$^f$,) which wires lead each from a reel or wire, as usual, and not shown. Each longitudinal or strand wire is in line with a twisting device, so that the twisters of the twisting device can operate around the strand-wires one on each side of the stay-wire, and a twisting-head 216 is provided for each longitudinal or strand wire, the arrangement for the final twisters and the initial twisters being specially shown in Fig. 8. The machine shown employs two leads of vertical or stay wires to produce a single vertical or stay wire, and these wires 249 and 249$^a$ are led each from a suitable reel, (not shown,) and each passes between a set of feed-wheels 242, as shown in Fig. 4. Each wire 249 and 249$^a$ is carried or forced across the bed plate or platform from one end to the other by the feed mechanism, and when in position initially the wires 249 and 249$^a$ are as shown by the full lines in Fig. 3, and when in this position, with the parts as shown, the machine is ready for operation.

The operation will be understood from the foregoing description of the parts, but briefly is as follows: The wires 249 and 249$^a$ for the vertical or stay wires are fed into the machine by the feed-wheels 242 or other suitable feed mechanism until the wires have reached and passed the longitudinal or strand wires farthest removed from the entering-point of the wires 249 and 249$^a$ into the machine, at which time the gear 236 has revolved to a point where the cog 237 leaves the pinion 239 and the smooth face 238 comes in line with the pinion, stopping further advance of the wires 249 and 249$^a$ by the stoppage of the feed wheels or disks. The wires 249 and 249$^a$, when entered fully, are in position to be cut into the sections for the vertical or stay wires, and with the cessation of the feed the movable cutters 163 are actuated, severing the wire between the movable cutter and the fixed cutter into sections. The wire 249 is severed between the first cutter and the second cutter on its side of the machine into a section 250, the wire 249$^a$ is severed between the first and second cutters on its side of the machine into a section 250$^a$ or the second section of the vertical or stay wire, the wire 249 is severed between the second cutter and the third cutter on its side of the machine into a section 250$^b$ or the third section of the vertical or stay wire, the wire 249$^a$ is severed between the second cutter and third cutter on its side of the machine into a section 250$^c$ or the fourth section of the vertical or stay wire, and that portion of the wire 249 between the third cutter and the inner end of the wire forms a section 250$^d$ or the fifth section of the vertical or stay wire, and that section of the wire 249$^a$ between the third cutter and the inner end of the wire forms a section 250$^e$ or the sixth section of the vertical or stay wire, making out of the six sections a single complete vertical or stay wire when the ends of the several sections are wrapped or coiled around the several longitudinal or strand wires. At the completion of the severance of the two wires into the sections, as just described, the carriers on opposite sides of the central openings are simultaneously advanced, carrying the sections 250, 250$^a$, 250$^b$, 250$^c$, and 250$^e$ initially into central line with the central slot of the table or platform, and in so carrying the sections of the wire initially it will be seen that section 250 and section 250$^a$ are moved toward the receiving end of the machine, as are also the sections 250 and 250$^c$; but the sections 250$^d$ and 250$^e$ are moved in the opposite direction owing to the opposite travel of the carriers by reason of the inclines of the slots 140, as already described. The sections of wire constituting the vertical or stay wire when carried centrally toward each other pass at their ends from the movable cutters and are free to drop into the heads 189 from the recesses of the carriers and are caught and held between the descending rods 188 and the heads 189, for which purpose the rods 188 are arranged staggered, as shown in Fig. 3, so that the first rod and its coacting head will engage the section 250 of the vertical or stay wire near its center, the next rod and its head will engage the section 250$^a$ near its center, and so on for the remainder of the rods and heads, each coacting rod and head engaging a section of the wire at or near the center of the section longitudinally of its length. The continued descent of the bar 187 carries down with it the rods 188 and stems 214, the rods and stems forcing the sections of the wires from the carriers to pass through the several openings between the abutments of the bed-plate or platform on each side of the central opening 130, and in so forcing the sections of wire down the heads 216 stand crosswise of the wire for each head to overlie and engage with the overlapped ends of two adjoining sections, as shown in Fig. 3. The first twister in descending turns upwardly the adjoining and overlapping ends of the sections 250 and 250$^a$ of the vertical or stay wire, the next twister turns upwardly the adjoining and overlapping ends of the sections 250$^a$ and 250$^b$ of the vertical or stay wire, the next twister turns upwardly the adjoining and overlapping ends of the sections 250$^b$ and 250$^c$ of the vertical or stay wire, the next twister turns upwardly the adjoining and overlapping ends of the sections 250$^c$ and 250$^d$, and the next twister turns upwardly the adjoining and overlapping ends of the sections 250$^d$ and 250$^e$ of the vertical or stay wire, bringing the ends into the position shown in Fig. 11. The first end of the section 250 and the last end of the section 250$^e$ of the vertical or stay wire are turned upwardly above the top and bottom longitudinal or strand wires by the action of the plates 194 195 and guides 196, completing the upward turning of the ends of the sections of the vertical or stay wires. The initial twisters are then operated through the racks 219 and 220 and pinions 218, causing the heads 216 of these twisters through the lips 217 to turn the adjoining and overlapping ends of the sections of the vertical or stay wires into an interlock, as shown in Fig. 12, in which operation the ends are carried to a point where they can be engaged by the pins of the main or final twisters and coiled or wrapped around the several longitudinal or strand wires. The racks 60 and 61 are raised as the initial twisters are depressed, which brings the twisting-pins 99 into position to operate on the upturned ends of the sections of the vertical or stay wires on that side of the machine at the same time as the initial twisters are operated, the several longitudinal or strand wires, as the twisters are operated, passing through the slots 102 of the casings and the slots 101 of the twister-sleeves and lying within the central hole through the twister-sleeves. The rollers 34$^a$ of the gears 20 and 21 have now entered the straight portion 34 at the upper end of the opening in the plate 33, and with the rotation of the bevel-gears the plates 33 are moved in opposite direction, carrying with them the plates 32 and swinging the upper ends of the levers 28 and 29 in opposite directions for the lever 28 to move the racks 44 and 61 in one direction and for the lever 29 to move the racks 45 and 60 in the opposite direction. The movement of the racks operates the pinions which are in engagement with the respective racks for each pinion to revolve its twister-sleeve, and as the sleeves are revolved the twisting-pins will coil or wrap the ends of the sections of the vertical or stay wire around the longitudinal or strand wires.

The first end of the section 250 of the vertical or stay wire in the final twisting or coiling operation will be engaged by the pin 99 of the twister for the strand-wire 248 next to the entering end of the vertical or stay wire and be wrapped or coiled around the longitudinal or strand wire.

The two twisters of the strand-wire 248$^a$ will engage the upturned and interlocked ends of the sections 250 and 250$^a$, the end of the section 250 being engaged by the pin 92 and the end of the section 250$^a$ being engaged by the pin 99, and as these pins have opposite directions of rotation the ends with which they engage will be coiled or wrapped around the strand-wire 248$^a$ in opposite directions. The two twisters of the strand-wire 248$^b$ will engage the upturned and interlocked ends of the sections 250 and 250$^b$, the end of the section 250$^a$ being engaged by the pin 99 and the end of the section 250$^b$ being engaged by the pin 92 of the twisters, and as these pins have opposite directions of rotation the ends of the sections 250$^a$ and 250$^b$ will be coiled or wrapped around the longitudinal or strand wire 248$^b$ in opposite directions. The two twisters of the strand-wire 248$^c$ will engage the upturned and interlocked ends of the sections 250$^b$ and 250$^c$ of the vertical or stay wire and coil or wrap the ends of these sections around the longitudinal or strand wire 248$^c$ in opposite directions. The same operation will take place between the two twisters of the strand-wire 248$^d$ and the upturned and interlocked ends of the sections 250$^c$ and 250$^d$ and between the two twisters of the strand-wire 248 and the upturned and interlocked ends of the sections 250$^d$ and 250$^e$, coiling or wrapping the upturned and interlocked ends of the respective sections around the respective longitudinal or strand wires. The last end of the section 250$^e$ of the vertical or stay wire will be engaged by the twisting-pin 92 of the last twister and coiled or wrapped around the strand-wire 248$^f$, thus uniting the several sections of the vertical or stay wire to the several longitudinal or strand wires.

It will be noticed that in coiling or wrapping the ends around the longitudinal or strand wires which are intermediate of the upper and lower wires the ends of a section will be coiled or wrapped around its longitudinal or strand wire in opposite directions—that is, one end of the section 250$^a$, as an illustration, will be coiled or wrapped to the left around the strand-wire 248$^a$ and the other end of the section 250$^a$ will be coiled or wrapped to the right around the strand-wire 248$^b$—with the result that by reason of the opposite wrapping or coiling of the ends of the sections of the vertical or stay wire around the longitudinal or strand wire and the coiling or wrapping of the ends of two sections on a longitudinal or strand wire, also in opposite directions, in connection with the interlocking between the adjoining ends of two sections of the vertical or stay wires produces a locking of the ends of the several sections of the vertical or stay wire to the longitudinal or strand wires, by which endwise or longitudinal movement of the vertical or stay wire on the longitudinal or strand wires will be prevented and the displacement or throwing out of line of the sections of a vertical or stay wire will be prevented. The action of the final or finishing twisters continues until the racks by which they are driven have reached the terminus of their advance throw by the passage of the rollers 34ᵃ from the straight end 34 of the opening, at which time the racks 60 and 61 drop and are free of their engagement with the twisted ends, and with the return-throw of the levers 2 and 29, by the action of the rollers 34ᵃ in the straight portion 34 at the opposite end of the opening in the plates 33, the twisters will be given a reverse rotation, returning the twisters to normal position with the twisters actuated by their racks 60 and 61 below the plane of the longitudinal or strand wires and leaving a clear space for the advance of the longitudinal or strand wires into position for the securing thereto of the next vertical or stay wire, which is fed forward by the feed devices, cut, carried centrally, held by the retainers, the ends of its sections upturned and interlocked, and finally coiled or wrapped around the strand-wires, as already described. These operations will continue until the required amount of fence has been produced, new longitudinal or strand wires and vertical or stay wires being supplied when the reels for these wires have been exhausted.

The machine is positive in its operation and will produce a fence in which the vertical or stay wires will be firmly locked in position on the longitudinal or strand wires, and it is to be understood that the number of longitudinal or strand wires can be varied and the length of the vertical or stay wires can be also varied to suit the height of the fence, which is governed by the number and distance apart of the longitudinal or strand wires, and while the machine as a whole has been described with considerable minuteness in order that its construction and operation may be understood it is not the intention thereby to confine the construction and arrangement of the mechanisms to that shown and described, as the invention contemplates such changes in construction and arrangement of parts as may be required for the style of fence and the requirements in use.

What I regard as new, and desire to secure by Letters Patent, is—

1. In a wire-fence machine, the combination of two bevel driving-gears arranged side by side and having opposite directions of rotation given thereto, a pair of oscillating levers, one actuated from each bevel-gear, two pairs of racks, one pair for each oscillating lever and having one bar of the pair connected with the lever and reciprocating both bars therefrom, one pair of racks having an opposite direction of travel to the other pair and each pair of racks having one bar of the pair on opposite sides of a transverse central line between the gears and adjacent to the bar of the other pair, a series of twisters for each rack, each twister having a revoluble sleeve for the passage of a strand-wire and each sleeve having a twisting-pin at its acting end for engaging the upturned ends of the sections of a divided vertical or stay wire and having a pinion at its butt-end engaging the racks for the reciprocation of the racks to rotate the pinions and cause the twisting-pins to coil or wrap the upturned ends of the sections of the vertical or stay wire around the longitudinal or strand wires, substantially as described.

2. In a wire-fence machine, the combination of a main driving-shaft, a bevel-pinion on the end of the shaft, two bevel driving-gears arranged side by side and each connected with the bevel-pinion and having opposite directions of rotation given thereto, a pair of oscillating levers, one actuated from each bevel-gear, two pairs of racks, one pair for each oscillating lever and having one bar of the pair connected with the lever and reciprocating both bars therefrom, one pair of racks having an opposite direction of travel to the other pair and each pair of racks having one bar of the pair on opposite sides of a transverse central line between the gears and adjacent to the bar of the other pair, a series of twisters for each rack, each twister having a revoluble sleeve for the passage of a strand-wire and each sleeve having a twisting-pin at its acting end for engaging the upturned ends of the sections of a divided vertical or stay wire, and having a pinion at its butt-end engaging the racks for the reciprocation of the racks to rotate the pinions and cause the twisting-pins to coil or wrap the upturned ends of the sections of the vertical or stay wire around the longitudinal or strand wires, substantially as described.

3. In a wire-fence machine, the combination of a revoluble gear, a roller projecting laterally from the gear, a slidable plate having therein an opening with straight ends and an oval center and into which opening the roller projects, a pivot-receiving plate adjacent to the slidable plate and movable therewith, a pivot projecting laterally into the center of the pivot-receiving plate, a lever carrying the pivot and pivotally supported at its lower end, a rack-bar connected with the upper end of the lever, and a series of twisters actuated from the rack-bar, substantially as described.

4. In a wire-fence machine, the combination of a revoluble gear, a roller projecting laterally from the gear, a slidable plate having therein an opening with straight ends and an oval center and into which opening the roller projects, a power-transmission plate adjacent to the slidable plate and movable therewith, a stud projecting laterally into the center of the power-transmission plate, a lever carrying the stud and pivotally supported at its lower end, a pair of rack-bars separated apart and connected at one end, with one of the rack-bars connected with the upper end of the lever, and a series of twisters for each rack-bar actuated from the reciprocation of the rack-bars, substantially as described.

5. In a wire-fence machine, the combination of a revoluble gear, a roller projecting laterally from the gear, a slidable plate having therein an opening with straight ends and an oval center and into which opening the roller projects, a power-transmission plate adjacent to the slidable plate and movable therewith, a stud projecting laterally into the center of the power-transmission plate, a lever carrying the stud and pivotally supported at its lower end, a link pivotally connected to the upper end of the lever, a rack-bar pivotally connected with the link, and a series of twisters actuated from the rack-bar, substantially as described.

6. In a wire-fence machine, the combination of a revoluble gear, a roller projecting laterally from the gear, a slidable plate having therein an opening with straight ends and an oval center and into which opening the roller projects, a power-transmission plate adjacent to the slidable plate and movable therewith, a stud projecting laterally into the center of the power-transmission plate, a lever carrying the stud and pivotally supported at its lower end, a link pivotally connected with the upper end of the lever, a pair of rack-bars separated apart and connected at one end and having one of the bars pivotally connected with the link, and a series of twisters for each rack-bar actuated from the reciprocation of the rack-bars, substantially as described.

7. In a wire-fence machine, the combination of a pair of revoluble gears, a roller projecting laterally from each gear, a pair of slidable plates, each plate having therein an opening with straight ends and an oval center and located adjacent to the outer face of the gear for the roller of the gear to project into the opening, a pair of power-transmission plates, one plate adjacent to each sliding plate and movable with the sliding plate, a stud projecting laterally into each power-transmission plate at the center, a pair of levers, one for each power-transmission plate and carrying the stud of the plate and having its lower end pivotally supported, a rack-bar connected with the upper end of each lever, and a series of twisters for each rack-bar and actuated from the reciprocation of the rack-bar, substantially as described.

8. In a wire-fence machine, the combination of a pair of revoluble gears, a roller projecting laterally from each gear, a pair of slidable plates, each plate having therein an opening with straight ends and an oval center and located adjacent to the outer face of the gear for the roller of the gear to project into the opening, a pair of power-transmission plates, one plate adjacent to each sliding plate and movable with the sliding plate, a stud projecting laterally into each power-transmission plate at the center, a pair of levers, one for each power-transmission plate and carrying the stud of the plate and having its lower end pivotally supported, a pair of rack-bars for each lever with the bars of a pair separated apart and connected at one end and having one of the bars connected with the upper end of its lever, and a series of twisters for each bar of the two pairs of rack-bars and actuated from the reciprocation of the rack-bars, substantially as described.

9. In a wire-fence machine, the combination of a pair of revoluble gears, a roller projecting laterally from each gear, a pair of slidable plates, each plate having therein an opening with straight ends and an oval center and located adjacent to the outer face of the gear for the roller of the gear to project into the opening, a pair of power-transmission plates, one plate adjacent to each sliding plate and movable with the sliding plate, a stud projecting laterally into each power-transmission plate at the center, a pair of levers, one for each power-transmission plate and carrying the stud of the plate and having its lower end pivotally supported, a link for each lever and pivotally connected to the upper end of the lever, a rack-bar for each link and pivotally connected with the link, and a series of twisters for each rack-bar and actuated from the reciprocation of the rack-bar, substantially as described.

10. In a wire-fence machine, the combination of a pair of revoluble gears, a roller projecting laterally from each gear, a pair of slidable plates, each plate having therein an opening with straight ends and an oval center and located adjacent to the outer face of the gear for the roller of the gear to project into the opening, a pair of power-transmission plates, one plate adjacent to each sliding plate and movable with the sliding plate, a stud projecting laterally into each power-transmission plate at the center, a pair of levers, one for each power-transmission plate and carrying the stud of the plate and having its lower end pivotally supported, a link for each lever pivotally connected to the upper end of the lever, a pair of rack-bars for each link pivotally connected with the link and separated apart and connected together at one end, and a series of twisters for each rack-bar actuated from the reciprocation of the rack-bars, substantially as described.

11. In a wire-fence machine, the combination of a revoluble gear, a roller projecting laterally from the gear, a slidable plate having therein an opening with straight ends and an oval center and into which opening the roller projects, a slidable bar carrying the sliding plate, a power-transmission plate adjacent to the slidable plate and movable therewith, a stud projecting laterally into the center of the power-transmission plate, a lever carrying the stud and pivotally supported at its lower end, a rack-bar connected with the upper end of the lever, and a series of twisters actuated from the rack-bar, substantially as described.

12. In a wire-fence machine, the combination of a revoluble gear, a roller projecting laterally from the gear, a sliding plate having therein an opening with straight ends and an oval center and into which opening the roller projects, a slidable bar having thereon the sliding plate, carrying-rollers between which the slidable bar moves, standards supporting the carrying-rollers, a power-transmission plate adjacent to the slidable plate and movable therewith, a stud projecting laterally into the center of the power-transmission plate, a lever carrying the stud and pivotally supported at its lower end, a rack-bar connected with the upper end of the lever, and a series of twisters actuated from the rack-bar, substantially as described.

13. In a wire-fence machine, the combination of a pair of revoluble gears, a roller on the exterior face of each gear and projecting laterally therefrom, a pair of slidable plates, each plate having therein an opening with straight ends and an oval center and located adjacent to the outer face of the gear for the roller of the gear to project into the opening, a slidable bar for each sliding plate, a pair of power-transmission plates one adjacent to and movable with each sliding plate, a stud projecting laterally into each power-transmission plate, a pair of levers, one lever for each power-transmission plate and carrying the stud of the plate and having its lower end pivotally supported, a link for each lever pivotally connected to the upper end of the lever, a pair of rack-bars for each link pivotally connected with the link and separated apart and connected together at one end, and a series of twisters for each rack-bar actuated from the reciprocation of the rack-bars, substantially as described.

14. In a wire-fence machine, the combination of a pair of revoluble gears, a roller on the exterior face of each gear and projecting laterally therefrom, a pair of slidable plates, each plate having therein an opening with straight ends and an oval center and located adjacent to the outer face of the gear for the roller of the gear to project into the opening, a slidable bar for each sliding plate, carrying-rollers between which the slidable bar moves, standards supporting the carrying-rollers, a pair of power-transmission plates adjacent to and movable with each sliding plate, a stud projecting laterally into each power-transmission plate, a pair of levers, one lever for each power-transmission plate and carrying the stud of the plate and having its lower end pivotally supported, a link for each lever pivotally connected to the upper end of the lever, a pair of rack-bars for each link pivotally connected with the link and separated apart and connected together at one end, and a series of twisters for each rack-bar actuated from the reciprocation of the rack-bars, substantially as described.

15. In a wire-fence machine, the combination of a pair of revoluble gears, a single shaft or journal on which both gears revolve in opposite directions, a single standard supporting the journal or shaft of the gears, a roller projecting laterally from each gear, a pair of sliding plates, one plate adjacent to each gear and each plate having therein an opening with straight ends and an oval center into which opening the roller of the gear projects, a pair of power-transmission plates, one plate adjacent to each sliding plate and movable therewith, a stud projecting laterally into each power-transmission plate, a lever carrying the stud and pivotally supported at its lower end, two pairs of rack-bars, one pair for each lever and connected with the upper end of the lever and having the two bars of the pair united together at one end, and a series of twisters for each rack-bar and actuated from the reciprocation of the rack-bars, substantially as described.

16. In a wire-fence machine, the combination of two pairs of rack-bars having opposite directions of travel and having the bars of a pair separated and arranged for a bar of one pair to be adjacent to a bar of the other pair, a series of twisters for each rack-bar with the twisters of a series actuated from the rack-bar, each twister having a revoluble sleeve for the passage of a longitudinal or strand wire and having at its acting end a twisting-pin for engaging the upturned end of a section of a divided vertical or stay wire and having at its butt-end a pinion engaging the rack-bar for the reciprocation of the racks to rotate the twister-sleeves and cause the twisting-pins to coil or wrap the ends of the sections of the vertical or stay wire around the longitudinal or strand wires, substantially as described.

17. In a wire-fence machine, the combination of two pairs of rack-bars having opposite directions of travel and having the bars of a pair separated and arranged for a bar of one pair to be adjacent to a bar of the other pair, a series of twisters for each rack-bar with the twisters of a series actuated from the rack-bar, the rack-bars and twisters on one side having a rising-and-falling movement given thereto and each twister having a revoluble sleeve for the passage of a longitudinal or strand wire and having at its acting end a twisting-pin for engaging the upturned end of a section of a divided vertical or stay wire and having at its butt-end a pinion engaging the rack-bar, for the reciprocation of the racks to rotate the twister-sleeves and cause the twisting-pins to coil or wrap the ends of the sections of the vertical or stay wire around the longitudinal or strand wires, substantially as described.

18. In a wire-fence machine, the combination of two pairs of rack-bars having opposite directions of travel and having the bars of a pair separated and arranged for a bar of one pair to be adjacent to a bar of the other pair, a series of twisters for each rack-bar with the twisters of a series actuated from the rack-bar, each twister consisting of a casing and a sleeve revoluble in the casing and through which a longitudinal or strand wire passes, and each sleeve having at its acting end a twisting-pin, with the casings and sleeves of the twisters on one side provided each with a vertical longitudinal slot, and a pinion for each twister-sleeve engaging the rack-bar that coacts with the twister, for the reciprocation of the racks to rotate the twister-sleeves and cause the twisting-pins to coil or wrap the ends of the sections of a divided vertical or stay wire around the longitudinal or strand wires, substantially as described.

19. In a wire-fence machine, the combination of two pairs of rack-bars having opposite directions of travel and having the bars of a pair separated and arranged for a bar of one pair to be adjacent to a bar of the other pair, a series of twisters for each rack-bar with the twisters of a series actuated from the rack-bar, each twister consisting of a casing and a sleeve revoluble in the casing and through which a longitudinal or strand wire passes, and each sleeve having at its acting end a twisting-pin, with the casings and sleeves of the twisters on the delivery side provided each with a vertical longitudinal slot, means for giving the twisters on the delivery side a rising-and-falling movement, and a pinion for each twister-sleeve engaging the rack-bar that coacts with the twister, for the reciprocation of the racks to rotate the twister-sleeves and cause the twisting-pins to coil or wrap the ends of the sections of a divided vertical or stay wire around the longitudinal or strand wires, substantially as described.

20. In a wire-fence machine, the combination of two pairs of rack-bars having opposite directions of travel and having the bars of a pair separated and arranged for a bar of one pair to be adjacent to a bar of the other pair, a series of twisters for each rack-bar with the twisters of a series actuated from the rack-bar, each twister consisting of a casing and a sleeve revoluble in the casing and through which a longitudinal or strand wire passes and each sleeve having at its acting end a twisting-pin, with the casings and sleeves of the twisters on the delivery side provided with a vertical longitudinal slot, a slidable supporting-plate carrying the racks and twisters on the delivery side, an arm depending from the supporting-plate at each end thereof, a lever for each arm for giving a rising-and-falling movement to the twisters and racks, and a pinion for each twister-sleeve engaging the rack-bar that coacts with the twister, for the reciprocation of the racks to rotate the twister-sleeves and cause the twisting-pins to coil or wrap the ends of the sections of a divided vertical or stay wire around the longitudinal or strand wires, substantially as described.

21. In a wire-fence machine, the combination of two pairs of rack-bars having opposite directions of travel and having the bars of a pair separated and arranged for a bar of one pair to be adjacent to a bar of the other pair, a series of twisters for each rack-bar with the twisters of a series actuated from the rack-bar, each twister consisting of a casing and a sleeve revoluble in the casing and through which a longitudinal or strand wire passes and each sleeve having at its acting end a twisting-pin, with the casings and sleeves of the twisters on the delivery side provided with a vertical longitudinal slot, a slidable supporting-plate carrying the racks and twisters on the delivery side, an arm depending from the supporting-plate at each end thereof, a lever for each arm for giving a rising-and-falling movement to the twisters and racks, a roller on the lever, a cam engaging the roller for giving a rising-and-falling movement to the racks and twisters on the delivery side, and a pinion for each twister-sleeve engaging the rack-bar that coacts with the twister, for the reciprocation of the racks to rotate the twister-sleeve and cause the twisting-pins to coil or wrap the ends of the sections of a divided vertical or stay wire around the longitudinal or strand wires, substantially as described.

22. In a wire-fence machine, the combination of a pair of revoluble gears, a pair of slidable plates, one adjacent to each gear and connected with the gear, a pair of pivot-receiving plates, one adjacent to and movable with each sliding plate, a pair of levers, one lever for each pivot-receiving plate and carrying the pivot of the plate, two pairs of rack-bars having the bars of a pair separated and arranged for a bar of one pair to be adjacent to a bar of the other pair and having one bar of a pair connected with the upper end of a lever, a series of twisters for each rack-bar with the twisters of a series actuated from the rack-bar, each twister having a revoluble sleeve for the passage of a longitudinal or strand wire and having at its acting end a twisting-pin for engaging the upturned end of a section of a divided vertical or stay wire and having at its butt-end a pinion engaging the rack-bar, for the reciprocation of the racks to rotate the twister-sleeves and cause the twisting-pins to coil or wrap the ends of the sections of the vertical or stay wire on the longitudinal or strand wires, substantially as described.

23. In a wire-fence machine, the combination of a pair of revoluble gears, a pair of slidable plates, one adjacent to each gear and connected with the gear, a pair of pivot-receiving plates, one adjacent to and movable with each sliding plate, a pair of levers, one lever for each pivot-receiving plate and carrying the pivot of the plate, two pairs of rack-bars having the bars of a pair separated and arranged for a bar of one pair to be adjacent to a bar of the other pair and having one bar of a pair connected with the upper end of a lever, a series of twisters for each rack-bar with the twisters of a series actuated from the rack-bar, the rack-bars and twisters on one side having a rising-and-falling movement given thereto, and each twister having at its acting end a twisting-pin for engaging the upturned end of a section of a divided vertical or stay wire and having at its butt-end a pinion engaging the rack-bar, for the reciprocation of the racks to rotate the twister-sleeves and cause the twisting-pins to coil or wrap the ends of the sections of the vertical or stay wire on the longitudinal or strand wires, substantially as described.

24. In a wire-fence machine, the combination of a pair of revoluble gears, a pair of slidable plates, one adjacent to each gear and connected with the gear, a pair of pivot-receiving plates, one adjacent to and movable with each sliding plate, a pair of levers, one lever for each pivot-receiving plate and carrying the pivot of the plate, two pairs of rack-bars having the bars of a pair separated and arranged for a bar of one pair to be adjacent to a bar of the other pair and having one bar of a pair connected with the upper end of a lever, a series of twisters for each rack-bar with the twisters of a series actuated from the rack-bar, each twister consisting of a casing and a sleeve revoluble in the casing and through which a longitudinal or strand wire passes, and each sleeve having at its acting end a twisting-pin, with the casings and sleeves of the twisters on one side provided each with a vertical longitudinal slot, and a pinion for each twister-sleeve engaging the rack-bar that coacts with the twister, for the reciprocation of the racks to rotate the twister-sleeves and cause the twisting-pins to coil or wrap the ends of the sections of a divided vertical or stay wire around the longitudinal or strand wires, substantially as described.

25. In a wire-fence machine, the combination of a pair of revoluble gears, a pair of slidable plates, one adjacent to each gear and connected with the gear, a pair of pivot-receiving plates, one adjacent to and movable with each sliding plate, a pair of levers, one lever for each pivot-receiving plate and carrying the pivot of the plate, two pairs of rack-bars having the bars of a pair separated and arranged for a bar of one pair to be adjacent to a bar of the other pair and having one bar of a pair connected with the upper end of a lever, a series of twisters for each rack-bar with the twisters of a series actuated from the rack-bar, each twister consisting of a casing and a sleeve revoluble in the casing and through which a longitudinal or strand wire passes, and each sleeve having at its acting end a twisting-pin, with the casings and sleeves of the twisters on the delivery side provided each with a vertical longitudinal slot, means for giving the twisters on the delivery side a rising-and-falling movement, and a pinion for each twister-sleeve engaging the rack-bar that coacts with the twister, for the reciprocation of the racks to rotate the twister-sleeves and cause the twisting-pins to coil or wrap the ends of the sections of a divided vertical or stay wire around the longitudinal or strand wires, substantially as described.

26. In a wire-fence machine, the combination of two pairs of rack-bars having opposite directions of travel and having the bars of a pair separated and arranged for a bar of one pair to be adjacent to a bar of the other pair, a series of twisters for each rack-bar with the twisters of a series actuated from its rack-bar, each twister consisting of a casing and a sleeve revoluble in the casing and through which a longitudinal or strand wire passes, and each sleeve having at its acting end a twisting-pin, with the casings and sleeves of the twisters of different lengths and arranged for a short-length casing and sleeve to be between two long-length casings and sleeves on each side, and a pinion for each twister-sleeve engaging the rack-bar that coacts with the twister, for the reciprocation of the racks to rotate the twister-sleeves of a series and cause the twisting-pins to coil or wrap the ends of the sections of a divided vertical or stay wire around the longitudinal or strand wires, substantially as described.

27. In a wire-fence machine, the combination of two pairs of rack-bars having opposite directions of travel and having the bars of a pair separated and arranged for a bar of one pair to be adjacent to a bar of the other pair, a series of twisters for each rack-bar with the twisters of a series actuated from its rack-bar, each twister consisting of a casing and a sleeve revoluble in the casing and through which a longitudinal or strand wire passes, and each sleeve having at its acting end a twisting-pin, with the casings and sleeves of the twisters of different lengths and arranged for a short-length casing and sleeve to be between two long-length casings and sleeves on each side, and with the casings and sleeves of the twisters on the delivery side provided with a vertical longitudinal slot and having a rising-and-falling movement given thereto, and a pinion for each twister-sleeve engaging the rack-bar that coacts with the twister, for the reciprocation of the racks to rotate the twister-sleeves of a series and cause the twisting-pins to coil or wrap the ends of the sections of a divided vertical or stay wire around the longitudinal or strand wires, substantially as described.

28. In a wire-fence machine, the combination of a pair of revoluble gears, a pair of slidable plates, one located adjacent to each gear and actuated from the gear, a pair of pivot-receiving plates, one located adjacent to and movable with each sliding plate, a pair of levers, one lever for each pivot-receiving plate and oscillated at its upper end by the movement of the pivot-receiving plates, two pairs of rack-bars, one bar connected with and actuated from each lever, and a series of twisters for each rack-bar actuated by the reciprocation of the rack-bars, substantially as described.

29. In a wire-fence machine, the combination of a revoluble gear, a slidable plate located adjacent to and actuated from the revoluble gear, a pivot-plate located adjacent to and movable with the sliding plate, a lever having a vibratable movement for its upper end and actuated from the movement of the pivot-plate, a rack-bar connected with the upper end of the lever, and a series of twisters actuated from the reciprocation of the rack-bar, substantially as described.

30. In a wire-fence machine, the combination of a bed-plate having a central opening endwise thereof and having on each edge of the opening a series of abutments with spaces between the abutments of varying lengths, a series of carriers on each side of the opening in the bed-plate and engaging the two wires of the vertical or stay wire and moving these wires centrally toward each other, and means for advancing and receding the carriers, substantially as described.

31. In a wire-fence machine, the combination of a bed-plate having a central opening endwise thereof and having on each edge of the opening a series of abutments with spaces between the abutments of varying lengths, a series of carriers on each side of the opening in the bed-plate, each carrier having an acting edge provided with a recess and engaging the two wires of the vertical or stay wire and moving these wires centrally toward each other, and means for advancing and receding the carriers, substantially as described.

32. In a wire-fence machine, the combination of a bed-plate having a central opening endwise thereof and having on each edge of the opening a series of abutments with spaces between the abutments of varying lengths, a series of carriers on each side of the opening in the bed-plate and arranged in pairs, each carrier having an acting edge provided with a recess engaging the two wires of the vertical or stay wire and moving these wires centrally toward each other, and means for advancing and receding the carriers, substantially as described.

33. In a wire-fence machine, the combination of a bed-plate having a central opening endwise thereof and having on each edge of the opening a series of abutments with spaces between the abutments of varying lengths, a series of carriers on each side of the opening in the bed-plate and arranged in pairs, one pair of carriers having an opposite diagonal advance and receding movement to the remaining pairs, each carrier having an acting edge provided with a recess and engaging the two wires of the vertical or stay wire and moving these wires centrally toward each other, and means for advancing and receding the carriers, substantially as described.

34. In a wire-fence machine, the combination of a bed-plate having a central opening endwise thereof and having on each edge of the opening abutments with spaces between the abutments of varying length, a series of carriers on each side of the opening arranged in pairs and each carrier having an acting edge provided with a recess, each carrier consisting of a head having the recessed acting edge and an arm, a diagonal slot in each carrier, a guide-pin for each slot, and means for advancing and receding the carriers simultaneously, substantially as described.

35. In a wire-fence machine, the combination of a bed-plate having a central opening endwise thereof and having on each edge of the opening abutments with spaces between the abutments of varying lengths, a series of carriers on each side of the opening arranged in pairs and each carrier having an acting edge provided with a recess, each carrier consisting of a head having the recessed acting edge and an arm, a diagonal slot in each carrier, a guide-pin for each slot, a link for each carrier on one side of the opening and pivotally connected at one end with the carrier, a lever having one end of the link pivotally connected to an arm thereof, a link pivotally connected to the other arm of each lever and pivotally connected to the opposite carrier, and means for moving the levers to simultaneously advance and recede both sets of carriers on each side of the opening, substantially as described.

36. In a wire-fence machine, the combination of a bed-plate having a central opening endwise thereof and having on each edge of the opening abutments with spaces between the abutments of varying lengths, a series of carriers on each side of the opening arranged in pairs and each carrier having an acting edge provided with recesses, each carrier consisting of a head having the recessed acting edge and an arm, a diagonal slot in each carrier, a guide-pin for each slot, a link for each carrier on one side of the opening and pivotally connected at one end with the carrier, a lever having one end of the link pivotally connected to an arm thereof, a link pivotally connected to the other arm of each lever and pivotally connected to the opposite carriers, a slidable bar pivotally connected with each lever, and means for reciprocating the bar, substantially as described.

38. In a wire-fence machine, the combination of a bed-plate having a central opening endwise thereof and having on each edge of the opening abutments with spaces between the abutments of varying lengths, a series of carriers on each side of the opening arranged in pairs and each carrier having an acting edge provided with a recess, each carrier consisting of a head having the recessed acting edge and an arm, a diagonal slot in each carrier, a guide-pin for each slot, a link for each carrier on one side of the opening and pivotally connected at one end with the carrier, a lever having one end of the link pivotally connected to an arm thereof, a link pivotally connected to the other arm of each lever and pivotally connected to the opposite carriers, a slidable bar pivotally connected with each lever, a pendant downwardly extending from the slidable bar, a movable contact engaging the pendant and moving the slidable bar in one direction, and a spring having a fixed connection at one end and connected at the opposite end with the pendant for returning the slidable bar, substantially as described.

38. In a wire-fence machine, the combination of a bed-plate, a vertically-slidable bar above the bed-plate and extending endwise thereof, a series of rods depending from the bar, a series of depressible heads, one for each rod, between which heads and the rods the wires of the vertical or stay wire are caught and held after being severed into sections, and means for actuating the slidable bar, substantially as described.

39. In a wire-fence machine, the combination of a bed-plate, a vertically-slidable bar above the bed-plate and extending endwise thereof, a series of rods depending from the bar, a series of depressible heads, one for each rod, between which heads and the rods the wires of the vertical or stay wire are caught and held after being severed into sections, a stem for each head, a spring for each stem, and means for actuating the slidable bar, substantially as described.

40. In a wire-fence machine, the combination of a bed-plate having extending endwise thereof a central opening and having on each edge of the opening abutments with spaces between the abutments of varying lengths, a series of carriers on each side of the opening arranged in pairs and each carrier having an acting edge, a series of fixed and movable cutters on opposite sides of the opening in the bed-plate, a slidable bar above the opening in the bed-plate, a series of rods depending from the bar, a series of depressible heads, one for each rod, and means for actuating the sliding bar, substantially as described.

41. In a wire-fence machine, the combination of a bed-plate having endwise thereof a central opening and having on each edge of the opening abutments with spaces between the abutments of varying lengths, a series of carriers on each side of the opening arranged in pairs and each carrier having an acting edge, a series of cutters on opposite sides of the bed-plate opening, a vertically-slidable bar above the opening in the bed-plate, a series of twisters depending from the slidable bar, each twister having a head with lips on the opposite sides, and means for actuating the slidable bar, substantially as described.

42. In a wire-fence machine, the combination of a bed-plate having endwise thereof a central opening and having on each edge of the opening abutments with spaces between the abutments of varying lengths, a series of carriers on each side of the opening arranged in pairs and each carrier having an acting edge, a series of cutters on opposite sides of the bed-plate opening, a vertically-slidable bar above the opening in the bed-plate, a series of twisters depending from the slidable bar, each twister having a head with lips on the opposite sides, means for actuating the slidable bar, a pinion on the upper end of each twister-stem, and racks engaging the pinions and turning the twisters, substantially as described.

43. In a wire-fence machine, the combination of a bed-plate having endwise thereof a central opening and having on each edge of the opening abutments with spaces between the abutments of varying lengths, a series of carriers on each side of the opening arranged in pairs and each carrier having an acting edge, a series of cutters on opposite sides of the bed-plate opening, a vertically-slidable bar above the opening in the bed-plate, a series of twisters depending from the slidable bar, each twister having a head with lips on the opposite sides, means for actuating the slidable bar, a pinion on the upper end of each twister-stem, racks engaging the pinions and turning the twisters, the racks united one to the other, a vibratable arm or lever connected with one of the rack-bars, and a cam for actuating the vibratable arm or lever, substantially as described.

44. In a wire-fence machine, the combination of a bed-plate having endwise thereof a central opening and having on each edge of the opening abutments with spaces between the abutments, a series of carriers on each side of the opening arranged in pairs and each carrier having an acting edge, a series of cutters on opposite sides of the bed-plate opening, a vertical slidable bar above the bed-plate opening, a series of rods depending from the vertical slidable bar, a series of depressible heads coacting with the rods and forming clamps or jaws with the rods, and a series of twisters depending from the vertical slidable bar, each twister having a head with lips on the opposite side for the descent of the twisters to upwardly turn the ends of the sections of a divided vertical or stay wire and for the heads of the twisters to interlock the upturned ends of the sections of the vertical or stay wire, substantially as described.

45. In a wire-fence machine, the combination of a bed-plate having endwise thereof a central opening and having on each edge of the opening abutments with spaces between the abutments, a series of carriers on each side of the opening arranged in pairs and each carrier having an acting edge, a series of cutters on opposite sides of the bed-plate opening, a series of rods depending from a vertical slidable bar, a series of depressible heads coacting with the rods and forming clamps or jaws with the rods, a series of twisters depending from the vertical slidable bar, each twister having a head with lips on the opposite side, for the descent of the twisters to upwardly turn the ends of the sections of a divided vertical or stay wire and for the heads of the twisters to interlock the upturned ends of the sections of the vertical or stay wire, plates depending from the vertically-slidable bar at each end thereof, and a guide coacting with the plates for upwardly turning the outer ends of the top and bottom sections of the vertical or stay wire, substantially as described.

46. In a wire-fence machine, the combination of a bed-plate having endwise thereof a central opening and having on each edge of the opening a series of abutments with spaces between the abutments, a series of carriers on each side of the opening in the bed-plate, each carrier having an acting edge adapted to receive and retain a wire of the vertical or stay wires and have the carriers move the wires centrally toward each other, a series of cutters on each side of the bed-plate opening, each cutter consisting of a fixed member and a movable member and adapted to sever the two wires held by the carriers into sections, and means for operating the movable parts of the cutters, substantially as described.

47. In a wire-fence machine, the combination of a bed-plate having endwise thereof a central opening and having on each edge of the opening a series of abutments with spaces between the abutments, a series of carriers on each side of the opening in the bed-plate, each carrier having an acting edge adapted to receive and retain a wire of the vertical or stay wire and have the carriers move the wires centrally toward each other, a series of cutters on each side of the bed-plate opening, each cutter consisting of a fixed member and a movable member and adapted to sever the two wires held by the carriers into sections, a rock-shaft carrying the movable members of the cutters on one side of the bed-plate opening, a link connected at one end with the rock-shaft and at the other end with the movable cutters on the opposite side of the bed-plate opening, a link connected at one end with the rock-shaft, a bell-crank lever having the link connected to one arm thereof, a cam or incline on the other arm of the bell-crank lever, a roller engaging the cam or incline, and a revoluble disk carrying the roller, substantially as described.

48. In a wire-fence machine, the combination of a bed-plate having endwise thereof a central opening and having on each edge of the opening a series of abutments, a series of carriers on opposite sides of the bed-plate opening, each carrier having an acting edge receiving and retaining a wire of the vertical or stay wire and each carrier having a sliding movement given thereto carrying the wires of the vertical or stay wire centrally toward each other, a series of cutters on each side of the bed-plate opening, each cutter consisting of a fixed member and a movable member and actuated to sever the wires of the vertical or stay wire into sections, and means for feeding the stay-wires inwardly on each side of the bed-plate opening and above the longitudinal or strand wires, substantially as described.

49. In a wire-fence machine, the combination of a bed-plate having endwise thereof a central opening and having on each edge of the opening a series of abutments, a series of carriers on opposite sides of the bed-plate opening, each carrier having an acting edge receiving and retaining a wire of the vertical or stay wire and each carrier having a sliding movement given thereto carrying the wires of the vertical or stay wire centrally toward each other, a series of cutters on each side of the bed-plate opening, each cutter consisting of a fixed member and a movable member and actuated to sever the wires of the vertical or stay wire into sections, means for feeding the stay-wires inwardly on each side of the bed-plate opening and above the longitudinal or strand wires, a vertically-slidable bar above the bed-plate opening, a series of rods depending from the bar, and a series of depressible heads coacting with the rods and forming clamps to centrally hold the wires of the vertical or stay wire in place, substantially as described.

50. In a wire-fence machine, the combination of a bed-plate having endwise thereof a central opening and having on each edge of the opening a series of abutments, a series of carriers on opposite sides of the bed-plate opening, each carrier having an acting edge receiving and retaining a wire of the vertical or stay wire and each carrier having a sliding movement given thereto carrying the wires of the vertical or stay wire centrally toward each other, a series of cutters on each side of the bed-plate opening, each cutter consisting of a fixed member and a movable member and actuated to sever the wires of the vertical or stay wire into sections, means for feeding the stay-wires inwardly on each side of the bed-plate opening and above the longitudinal or strand wires, a vertically-slidable bar above the bed-plate opening, a series of rods depending from the bar, a series of depressible heads coacting with the rods and forming clamps to centrally hold the wires of the vertical or stay wire in place, a series of twisters depending from the vertically-slidable bar, each twister having a head with lips on opposite sides thereof, the twisters operating to upwardly turn and interlock the adjacent ends of the sections of the vertical or stay wire, and means for actuating the twisters, substantially as described.

51. In a wire-fence machine, the combination of a bed-plate having endwise thereof a central opening and having on each edge of the opening a series of abutments, a series of carriers on opposite sides of the bed-plate opening, each carrier having an acting edge receiving and retaining a wire of the vertical or stay wire and each carrier having a sliding movement given thereto carrying the wires of the vertical or stay wire centrally toward each other, a series of cutters on each side of the bed-plate opening, each cutter consisting of a fixed member and a movable member and actuated to sever the wires of the vertical or stay wire into sections, means for feeding the stay-wires inwardly on each side of the bed-plate opening and above the longitudinal or strand wires, a series of rods depending from the bar, a series of depressible heads coacting with the rods and forming clamps to centrally hold the wires of the vertical or stay wire in place, a series of twisters depending from the vertically-slidable bar, each twister having a head with lips on opposite sides thereof, the twisters operating to upwardly turn and interlock the adjacent ends of the sections of the vertical or stay wire, means for actuating the twisters, a pair of plates depending from each end of the vertically-slidable bar, and a guide coacting with the plates for upwardly turning the outer ends of the top and bottom sections of the vertical or stay wire, substantially as described.

52. In a wire-fence machine, the combination of a bed-plate having endwise thereof a central opening and having on each edge of the opening a series of abutments, a series of carriers on opposite sides of the bed-plate opening, each carrier having an acting edge receiving and retaining a wire of the vertical or stay wire and each carrier having a sliding movement given thereto carrying the wires of the vertical or stay wire centrally toward each other, a series of cutters on each side of the bed-plate opening, each cutter consisting of a fixed member and a movable member and actuated to sever the wires of the vertical or stay wire into sections, means for feeding the stay-wires inwardly on each side of the bed-plate opening and above the longitudinal or strand wires, a series of rods depending from the bar, a series of depressible heads coacting with the rods and forming clamps to centrally hold the wires of the vertical or stay wire in place, a series of twisters depending from the vertically-slidable bar, each twister having a head with lips on opposite sides thereof, the twisters operating to upwardly turn and interlock the adjacent ends of the sections of the vertical or stay wire, means for actuating the twisters, a pair of plates depending from each end of the vertically-slidable bar, a guide coacting with the plates for upwardly turning the outer ends of the top and bottom sections of the vertical or stay wire, a series of twisters below the bed-plate and on opposite sides of the bed-plate opening, each twister having a pin for engaging the upturned end of a section of the vertical or stay wire, winding the ends of the sections of the vertical or stay wire around the strand-wire, substantially as described.

53. In a wire-fence machine, the combination of horizontally-sliding carriers, one carrier for each division of a vertical or stay wire, each carrier engaging its division of the vertical or stay wire and moving the same centrally toward each other, means for advancing and receding the carriers, and a series of depressible clamps between which the vertical or stay wire is caught and held after being severed into sections, means for severing the vertical or stay wire into sections, and means for depressing the clamps, substantially as described.

54. In a wire-fence machine, the combination of horizontally-sliding carriers, one carrier for each division of a vertical or stay wire, each carrier engaging its division of the vertical or stay wire and moving the same centrally toward each other, means for advancing and receding the carriers, a series of depressible clamps between which the vertical or stay wire is caught and held after being severed into sections, means for severing the vertical or stay wire into sections, and means for depressing the clamps, substantially as described.

55. In a wire-fence machine, the combination of horizontally-sliding carriers, one carrier for each division of a vertical or stay wire, each carrier engaging its division of the vertical or stay wire and moving the same centrally toward each other, means for advancing and receding the carriers, a series of depressible clamps between which the vertical or stay wire is caught and held after being severed into sections, means for severing the vertical or stay wire into sections, means for depressing the clamps, and a series of initial twisters operating to engage the upturned ends of the sections of the vertical or stay wire and interlock such ends, substantially as described.

56. In a wire-fence machine, the combination of horizontally-sliding carriers, one carrier for each division of a vertical or stay wire, each carrier engaging its division of the vertical or stay wire and moving the same centrally toward each other, means for advancing and receding the carriers, a series of depressible clamps between which the vertical or stay wire is caught and held after being severed into sections, means for severing the vertical or stay wire into sections, means for depressing the clamps, a series of initial twisters operating to engage the upturned ends of the sections of the vertical or stay wire and interlock such ends, and a series of twisters for the main or strand wires, located below the initial twisters and operating to coil the ends of the sections of the vertical or stay wire around the strand-wires, substantially as described.

57. In a wire-fence machine, the combination of means for advancing the sections of a vertical or stay wire centrally toward each other, depressible clamps receiving and holding the sections of the vertical or stay wire when advanced to the central position, means for depressing the clamps and upwardly turning the ends of the sections of the vertical or stay wire, and initial twisters operating to interlock the upturned ends of the vertical or stay wire, substantially as described.

58. In a wire-fence machine, the combination of means for advancing the sections of a vertical or stay wire centrally toward each other, depressible clamps receiving and holding the sections of the vertical or stay wire when advanced to the central position, means for depressing the clamps and upwardly turning the ends of the sections of the vertical or stay wire, initial twisters operating to interlock the upturned ends of the vertical or stay wires, and a series of twisters located below the initial twisters and operating to coil the ends of the sections of the vertical or stay wire around the strand-wires, substantially as described.

59. In a wire-fence machine, the combination of a bed-plate having therein a longitudinal opening, a series of twisters below the bed-plate and on opposite sides of the bed-plate opening, each twister engaging the upturned end of a section of a vertical or stay wire and coiling the ends of the sections of the vertical or stay wire around the several strand-wires, substantially as described.

60. In a wire-fence machine, the combination of two series of twisters, each series operating for each twister of the series to engage the upturned end of a section of a divided vertical or stay wire and coil such end around a main or strand wire, with the twisters of one series having a rising-and-falling movement, and each twister of the rising and falling series having a slot for the passage of the main or strand wire, for allowing the advance of the wire fence when the twisters of the rising and falling series are dropped below the plane of movement of the fence, substantially as described.

61. In a wire-fence machine, the combination of two series of twisters, each series operating for each twister of the series to engage the upturned end of a section of a divided vertical or stay wire and coil such end around a main or strand wire, with the twisters of one series having a rising-and-falling movement and each twister of the rising and falling series having a slot for the passage of the main or strand wire, for allowing the advance of the wire fence when the twisters of the rising and falling series are dropped below the plane of movement of the fence, and means for raising and lowering the twisters of the rising and falling series, substantially as described.

JOHN E. FREDRICK.

Witnesses:
S. S. SHAMBAUGH,
OSCAR W. BOND.